United States Patent [19]
Kikuchi et al.

[11] Patent Number: 5,440,413
[45] Date of Patent: Aug. 8, 1995

[54] LIQUID CRYSTAL DISPLAY DEVICE WITH 2 ADJACENT BIAXIAL RETARDATION PLATES HAVING $N_y < N_z < N_x$

[75] Inventors: Zenta Kikuchi, Hamura; Takashi Miyashita, Hachioji, both of Japan

[73] Assignee: Casio Computer Co., Ltd., Tokyo, Japan

[21] Appl. No.: 950,886

[22] Filed: Sep. 22, 1992

[30] Foreign Application Priority Data

| Sep. 30, 1991 | [JP] | Japan | 3-278455 |
| Jul. 3, 1992 | [JP] | Japan | 4-177083 |
| Jul. 22, 1992 | [JP] | Japan | 4-215735 |

[51] Int. Cl.⁶ .................................................. G02F 1/335
[52] U.S. Cl. .................................................. 359/73
[58] Field of Search ...................................... 359/73

[56] References Cited

U.S. PATENT DOCUMENTS

| 4,385,806 | 5/1983 | Fergason | 359/73 |
| 5,016,988 | 5/1991 | Iimura | 359/63 |
| 5,018,839 | 5/1991 | Yamamoto et al. | 359/73 |
| 5,107,356 | 4/1992 | Castleberry | 359/73 |
| 5,150,235 | 9/1992 | Haim et al. | 359/73 |
| 5,155,608 | 10/1992 | Hatano | 359/93 |
| 5,157,523 | 10/1992 | Yamagishi et al. | 359/41 |
| 5,184,236 | 2/1993 | Miyashita et al. | 359/63 |
| 5,194,975 | 3/1993 | Akatsaka et al. | 359/93 |
| 5,227,903 | 7/1993 | Miyazawa et al. | 359/73 |
| 5,245,456 | 9/1993 | Yoshimi et al. | 359/73 |
| 5,249,071 | 9/1993 | Yoshimizu et al. | 359/73 |

Primary Examiner—William L. Sikes
Assistant Examiner—Ron Trice
Attorney, Agent, or Firm—Frishauf, Holtz, Goodman & Woodward

[57] ABSTRACT

A polarizer and an analyzer are respectively arranged on the incident and exit sides of a twisted nematic liquid crystal cell, and at least one biaxial retardation plate is arranged between the polarizer and the analyzer. The biaxial retardation plate is arranged such that its phase delay axis is parallel or perpendicular to the aligning treatment direction of an aligning film on the incident side of the liquid crystal cell. The polarizer is arranged such that its light-transmitting axis is parallel or perpendicular to the incident-side aligning treatment direction. The light-transmitting axis of the analyzer is set to be perpendicular to the light-transmitting axis of the polarizer. A liquid crystal material sealed in the twisted nematic liquid crystal cell is twisted at about 90°. The biaxial retardation plate has a refractive index $n_X$ in an extending direction of the retardation plate, a refractive index $n_Y$ in a direction perpendicular to the extending direction, and a refractive index $n_Z$ in a direction of thickness, which satisfy the relation $n_Y < n_Z < n_X$. A product $\Delta n \cdot d$ of a refractive index anisotropy $\Delta n$ and a thickness d of the biaxial retardation plate falls within the range of approximately 300 to 400 nm.

8 Claims, 25 Drawing Sheets

LIQUID CRYSTAL DISPLAY DEVICE WITH 2 ADJACENT BIAXIAL RETARDATION PLATES HAVING $N_y < N_z < N_x$

BACKGROUND OF THE INVENTION

1. Field of the Invention

The present invention relates to a twisted nematic (TN) liquid crystal display device and, more particularly, to a TN liquid crystal display device which is improved in terms of visual angle dependence of contrast and color in halftone display.

2. Description of the Related Art

Recently, TFT-TN liquid crystal display devices have been used as displays for wordprocessors, personal computers, and the like. In such a liquid crystal display device, a polarizer is normally arranged on the incident side of a TN liquid crystal cell, in which a thin-film transistor (TFT) for a drive operation is arranged for each pixel, in such a manner that its light-transmitting axis is parallel to the aligning treatment direction of the incident-side substrate of the liquid crystal cell, whereas an analyzer is arranged on the exit side of the liquid crystal cell in such a manner that its light-transmitting axis is almost perpendicular to the light-transmitting axis of the polarizer. In this liquid crystal display device, each pixel can be driven by applying a static voltage to it. For this reason, the liquid crystal display device of this type exhibits higher contrast and a larger viewing angle than a simple matrix type liquid crystal display device.

However, the viewing angle of such a conventional TFT-TN liquid crystal display device is smaller than that of a CRT as a general-purpose display. In addition, in halftone display, changes in color occur in accordance with changes in visual angle (angle of gaze with respect to the normal line of a display surface), i.e., the visual angle dependence of changes in color is conspicuous.

FIG. 1 shows equi-contrast curves obtained when applied voltages are set as V=0 [V] and V=4.38 [V] in a typical conventional TN liquid crystal display device. Referring to FIG. 1, the concentric circles respectively represent, from the innermost circle, visual angles of 10°, 20°, 30°, 40°, and 50° with respect to the normal direction of a substrate of the liquid crystal display device. In addition, each black square ( ) represents that the contrast is 10; each white square (□), 50; each black triangle ( ), 100; and each white triangle (△), 150. An arrow R indicates the aligning treatment direction of the incident-side substrate. According to FIG. 1, the visual angle direction in which the contrast is high is the downward position at which an angle representing the azimuth of the display surface (to be referred to as an azimuth angle hereinafter) is 315° with reference to the aligning treatment direction R of the incident-side substrate, and the regions in which the contrast is high expand in the leftward and rightward directions corresponding to azimuth angles of 225° and 45°, which are apparently brighter than the region expanding in the upward and downward directions corresponding to azimuth angles of 135° and 315°. In addition, the region expanding in the downward direction has higher contrast than that of the region expanding in the upward direction. Although no inversion region is present near the region expanding in the upward direction, this region corresponds to the visual angle direction in which the contrast is lowest.

FIGS. 2A to 2D show the visual angle dependence of Y-V curves representing the relationship between a transmittance Y and an applied voltage V. As shown in FIG. 2A, if the visual angle is changed within the ranged of 0° to 50° in the downward direction corresponding to an azimuth angle of 315°, a large lump portion appears in a range of the Y-V curve which corresponds to V=2.0 to 4.0 [V]. Since an applied voltage range in which halftone display is performed corresponds to V=1.5 to 4.0 [V], if halftone display is performed, a phenomenon of brightness inversion becomes conspicuous.

As shown in FIGS. 2B and 2C, the above-mentioned phenomenon does not occur in the rightward direction corresponding to an azimuth angle of 45° on the display surface and in the leftward direction corresponding to an azimuth angle of 225°. As shown in FIG. 2D, however, if the visual angle is changed within the range of 0° to 50° in the upward direction corresponding to an azimuth angle of 135°, a Y-V curve is gradually moderated, and the difference of brightness between halftone levels is reduced to zero.

Prior to a description of the visual angle dependence of changes in color in the conventional TN liquid crystal display device, a color difference ΔE*, a brightness index difference ΔL*, and a chroma difference ΔC* will be described first. The color difference ΔE* means "the distance between display colors", regarding "display colors" at the front visual angle as standard colors. The color difference ΔE* is determined by the brightness index difference ΔL* and the chroma difference ΔC*. These physical amounts are defined in a CIE 1976 (L*, u*, v*) colorimetric space.

The following are conversion formulae for converting values from a normal (X, Y, Z) colorimetric space to the CIE 1976 (L*, u*, v*) colorimetric space:

$\Delta E_{uv}{}^* = \sqrt{(\Delta L^*)^2 + (\Delta C^*)^2}$  : color difference $\Delta L^* = abs(L_2^* - L_1^*)$: brightness index difference $\Delta C^* = \sqrt{(\Delta U^*)^2 + (\Delta V^*)^2}$  : chroma difference $\Delta u^* = abs(u_2^* - u_1^*)$: chromaticness index difference
$\Delta v^* = abs(v_2^* - v_1^*)$: chromaticness index difference
$L_i^* = 116 \cdot (Y_i/Y_o)^{\frac{1}{3}} - 16$
(If, however, $i = 0, 1, 2,$ and $(Y_i/Y_o)$ is 0.008856
or less, $L_i^* = 903.29 \cdot (Y_i/Y_o)$)
$u_i^* = 13 \cdot L_i^*(u_i' - u_o')$
$v_i^* = 13 \cdot L_i^*(v_i' - v_o')$
$u_i' = 4 \cdot X_i/(X_i + 15 \cdot Y_i + 3 \cdot Z_i)$
$v_i' = 9 \cdot Y_i/(X_i + 15 \cdot Y_i + 3 \cdot Z_i)$
(where $X_i$, $Y_i$, and $Z_i$ are values in the XYZ colorimetric system)

FIGS. 3A to 3F, 4A to 4F, and 5A to 5F are graphs respectively showing the visual angle dependence of the color difference ΔE*, the brightness index difference ΔL*, and the chroma difference ΔC* in four directions, i.e., upward, downward, leftward, and downward directions (azimuth angles: 135°, 315°, 225°, 45°) for six different applied voltages. In this case, the six different applied voltages are: 0 V, 1.5 V, 2 V, 2.5 V, 3 V, and 4 V. In each graph, a white square (□), a plus (+), a white circle (○), and a white triangle (△) indicate values obtained when the visual angle is changed in the upward, downward, leftward, and rightward directions, respectively.

As is apparent from these graphs, in the conventional TFT-TN liquid crystal display device, the difference between "display colors" with respect to changes in visual angle in halftone display is undesirably large. Under the circumstances, it is required for the conventional TFT-TN liquid crystal display device to improve the visual angle dependence of contrast and display color (to be referred to as visual angle characteristics hereinafter) so as to accurately display images, especially halftone images, in multi-gradation display regardless of visual angles.

SUMMARY OF THE INVENTION

The present invention has been made in consideration of the above situation, and has as its object to provide a liquid crystal display device which has excellent visual angle characteristics and can accurately display gradation.

In order to achieve the above object, according to the present invention, a liquid crystal display device comprises a pair of substrates having opposing surfaces on which crossing electrodes and aligning films covering the electrodes are formed, the aligning films having undergone aligning treatment in a predetermined direction; a liquid crystal material existing between the aligning films and having molecules twisted at an angle of about 80° to 120° from one substrate to the other substrate of the pair of substrates; a polarizer arranged on an incident side of the liquid crystal cell; an analyzer arranged on an exit side of the liquid crystal cell; and one or a plurality of retardation plates including at least one biaxial retardation plate arranged between the polarizer and the analyzer and having a refractive index $n_X$ in an extending direction of the retardation plate, a refractive index $n_Y$ in a direction perpendicular to the extending direction, and a refractive index $N_Z$ in a direction of thickness, which satisfy $n_Y < n_Z < n_X$, the directions being perpendicular to each other.

According to the liquid crystal display device having the above-described arrangement, differences in phase difference between light obliquely transmitted through the liquid crystal cell and light vertically transmitted therethrough are compensated by the biaxial retardation plate. As a result, the phenomenon of brightness inversion in halftone display is suppressed, and changes in color with changes in visual angle in the leftward and rightward directions in a halftone display operation are reduced, thereby reliably displaying accurate gradation.

In the above-described liquid crystal display device, the biaxial retardation plate is preferably arranged such that its phase delay axis is almost parallel or perpendicular to the aligning treatment direction of the incident-side aligning film. In addition, a product $\Delta n \cdot d$ of a refractive index anisotropy $\Delta n$ and a thickness d of the biaxial retardation plate preferably falls within the range of 300 to 400 nm.

The retardation plate may comprise one biaxial retardation plate or two biaxial retardation plates. In the former case, the biaxial retardation plate may be arranged between the analyzer and one of the substrates which opposes the analyzer. In the latter case, the two biaxial retardation plates may be arranged on one side of the liquid crystal cell or may be respectively arranged on both sides of the liquid crystal cell.

When the two biaxial retardation plates are to be arranged to sandwich the liquid crystal cell, one retardation plate is arranged between the liquid crystal cell and the polarizer, and the other retardation plate is arranged between the liquid crystal cell and the analyzer. In this case, the two biaxial retardation plates are preferably arranged such that their phase delay axes are parallel to each other.

when the two biaxial retardation plates are to be arranged on one side of the liquid crystal cell, they are preferably arranged between the liquid crystal cell and the analyzer. In this case, the two biaxial retardation plates are preferably arranged such that their phase delay axes are perpendicular to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be described in detail below with reference to FIGS. 6 to 25F.

[First Embodiment]

Figure 6:
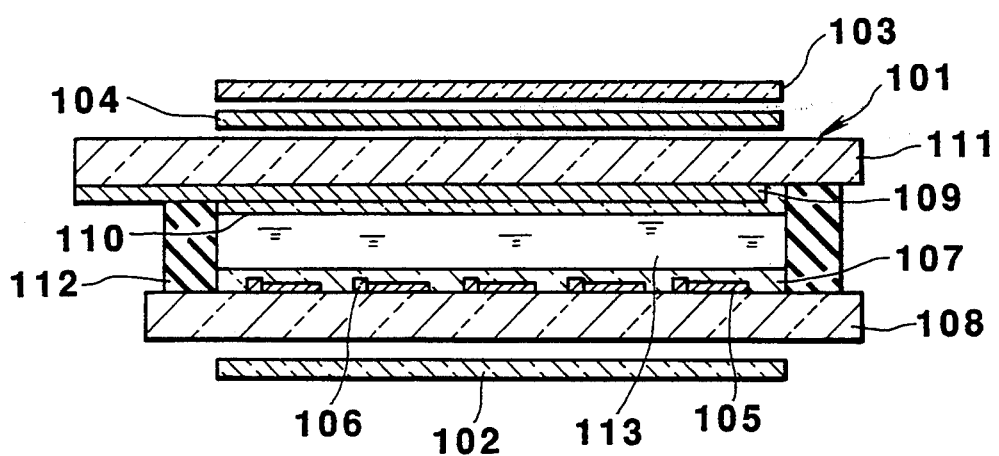
FIG. 6 is a sectional view showing a liquid crystal display device according to a first embodiment of the present invention.
Figure 7:
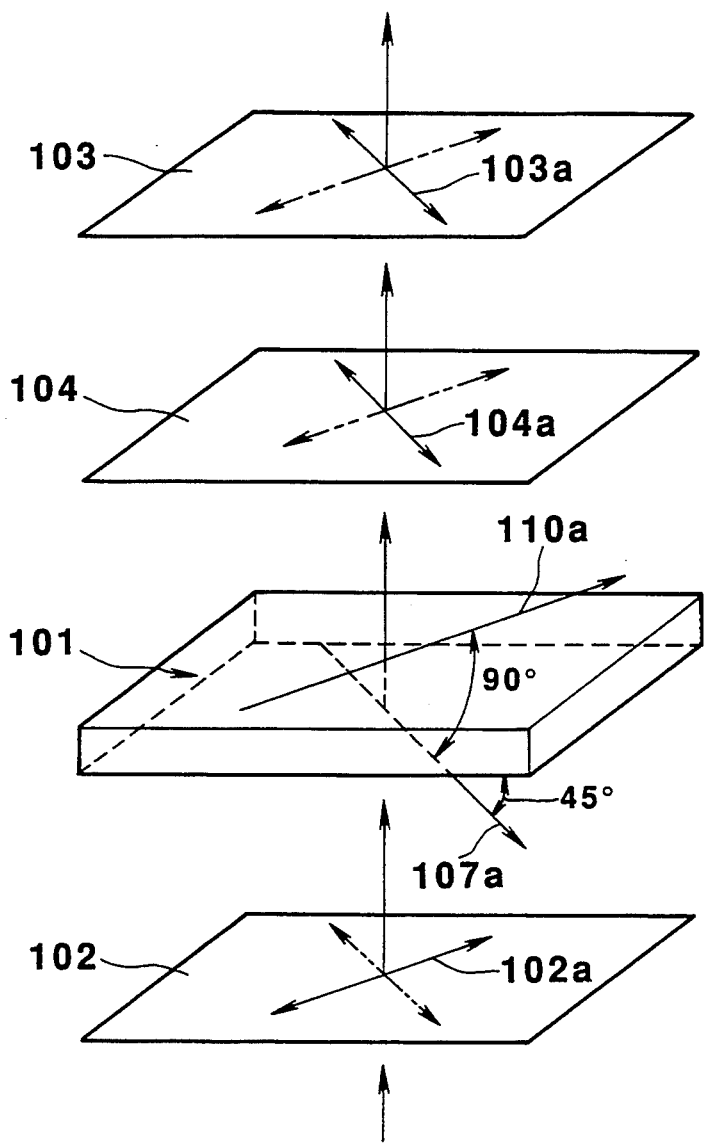
FIG. 7 is an exploded perspective view showing the schematic arrangement of the first embodiment.

FIGS. 6 and 7 are a sectional view and an exploded perspective view, respectively, of a liquid crystal display device according to a first embodiment of the present invention. In this liquid crystal display device, a polarizer 102 and an analyzer 103 are respectively arranged on the incident and exit sides of a twisted nematic liquid crystal cell 101, and a retardation plate 104 having optical biaxial properties (to be referred to as a biaxial retardation plate hereinafter) is arranged between the liquid crystal cell 101 and the analyzer 103.

The liquid crystal cell 101 comprises a lower substrate 108, an upper substrate 111, a seal member 112, and a liquid crystal material 113. One set of electrodes 105, driving thin-film transistors (TFTs) respectively arranged for the pixels of the electrodes 105, and an aligning film 107 covering them are formed on the lower substrate 108. The other set of electrodes 109 which are perpendicular and opposite to one set of electrodes 105, and an aligning film 110 covering the electrodes 109 are formed on the upper substrate 111. The seal member 112 serves to bond the upper and lower substrates 108 and 111 to each other through a predetermined gap. The liquid crystal material 113 is sealed in a region enclosed with the upper and lower substrates 108 and 111 and the seal member 112, and has a ratio d/p of a gap d to a natural pitch p=about 0.05. Note that light is incident on this liquid crystal cell 101 from below in FIGS. 6 and 7. Hence, the lower substrate will be referred to as the incident-side substrate 108; and the upper substrate, the exit-side substrate 111.

The aligning films 107 and 110 respectively formed on the opposing surfaces of the incident-side substrate 108 and the exit-side substrate 111 have undergone aligning treatment such as rubbing. More specifically, aligning treatment is performed with respect to the aligning film 107 on the incident-side substrate 108 in a direction 107a inclined at about 45° from the upper left to the lower right of the liquid crystal cell 101 whose longitudinal direction is parallel to the horizontal direction, when viewed from the front surface side (exit side) of the liquid crystal cell 101, as shown in FIG. 7. Aligning treatment is performed with respect to the aligning film 110 on the exit-side substrate 111 in a direction 110a rotated in a clockwise direction (when viewed from the exit side) through about 90° with respect to the aligning treatment direction 107a of the incident-side aligning film 107 (to be referred to as an incident-side aligning treatment direction hereinafter). With such aligning treatment, the molecules of the liquid crystal material 113 are twisted at about 90° (preferably, 80° to 120°) clockwise, when viewed from the exit side. In this case, the liquid crystal molecules are aligned at a pretilt angle of about 1°. A product Δn·d of a gap d and a refractive index anisotropy Δn of the liquid crystal cell 101 preferably falls within the range of 350 to 550 nm and is preferably set to be 380 nm (measurement wavelength: 589 nm).

The polarizer 102 is arranged such that its transmission axis 102a is almost perpendicular to the incident-side aligning treatment direction 107a of the liquid crystal cell 101. The analyzer 103 is arranged such that its transmission axis 103a is almost perpendicular to the transmission axis 102a of the polarizer 102.

The biaxial retardation plate 104 is composed of polycarbonate and has a refractive index $n_X$ in the extending direction, a refractive index $n_Y$ in the direction perpendicular to the extending direction, and a refractive index $n_Z$ in the direction of thickness. These refractive indexes in the three directions satisfy the following relation:

$$n_Y < n_Z < n_X$$

The extending direction coincides with the phase delay axis or slow axis of the biaxial retardation plate 104. A product Δn·d of Δn ($n_X - n_Y$) and a thickness d of the biaxial retardation plate 104 falls within the range of 300 to 400 nm, and is preferably set to be 365 nm (measurement wavelength: 589 nm). The biaxial retardation plate 104 is arranged such that a phase delay axis 104a in the extending direction is almost parallel to the incident-side aligning treatment direction 107a.

According to the first embodiment having the above-described arrangement, since the biaxial retardation plate 104 has the refractive indexes in the three directions, which satisfy $n_Y < n_Z < n_X$, differences in phase difference between light obliquely transmitted through the liquid crystal cell 101 and light vertically transmitted therethrough are almost completely corrected by the biaxial retardation plate 104, thereby achieving high contrast in visual angle directions and preventing the phenomenon of brightness inversion in halftone display in a multi-gradation display operation. As a result, changes in color with changes in visual angle in the leftward and rightward directions in a halftone display operation are suppressed, and the visual angle characteristics are greatly improved, thus reliably displaying accurate gradation.

Figure 8:
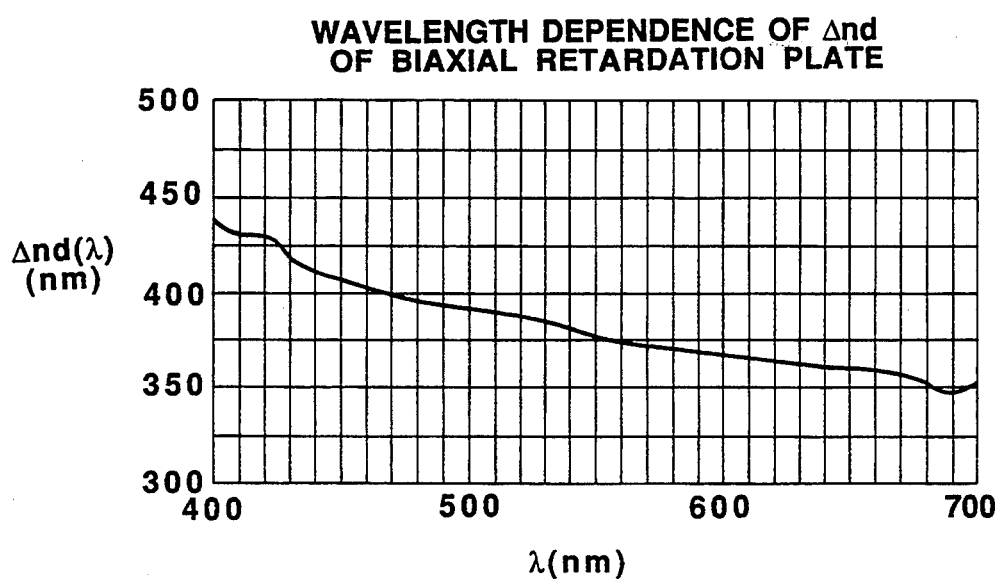
FIG. 8 is a graph showing the wavelength dependence of Δn·d of a biaxial retardation plate.
Figure 9A:
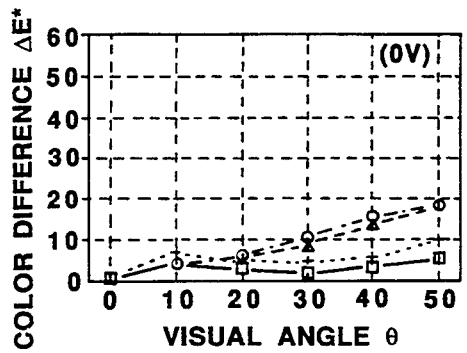
FIGS. 9A to 9F are graphs showing the visual angle dependence of a color difference ΔE* for six different applied voltages and for different directions, respectively, in which the visual angle is changed in the liquid crystal display device of the first embodiment.
Figure 9D:
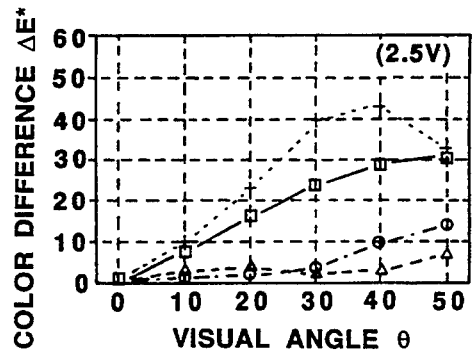
Figure 9B:
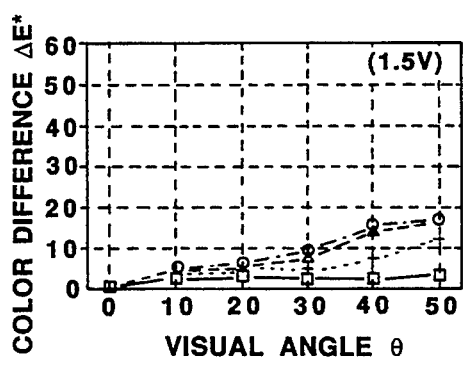
Figure 9E:
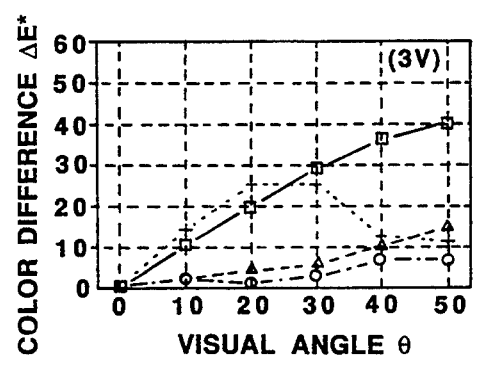
Figure 9C:
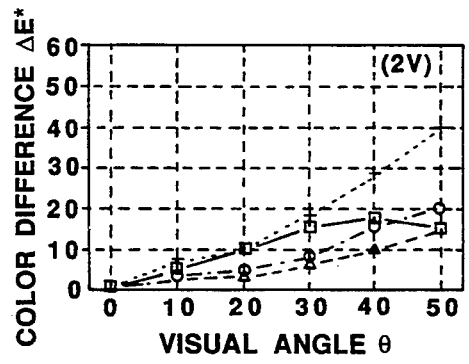
Figure 9F:
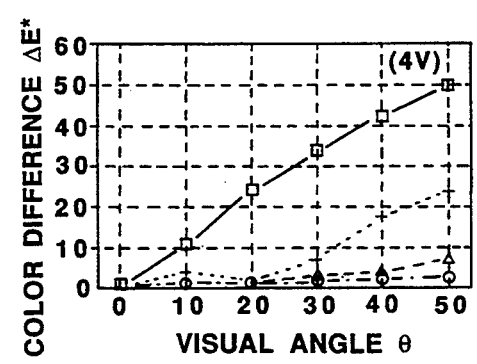
Figure 10A:
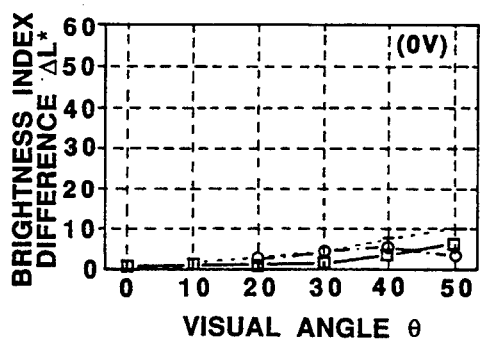
FIGS. 10A to 10F are graphs showing the visual angle dependence of a brightness index difference ΔL* for six different applied voltages and for different directions, respectively, in which the visual angle is changed in the liquid crystal display device of the first embodiment.
Figure 10D:
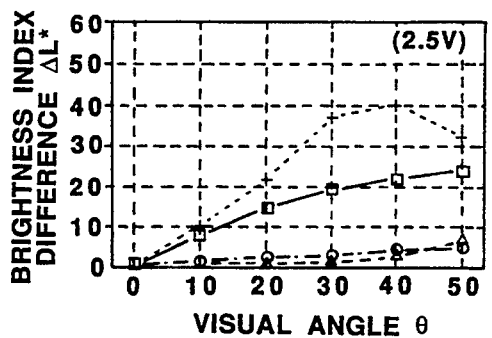
Figure 10B:
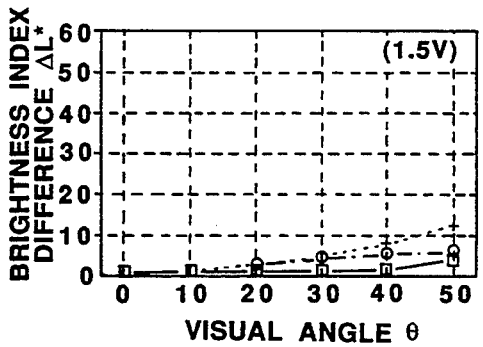
Figure 10E:
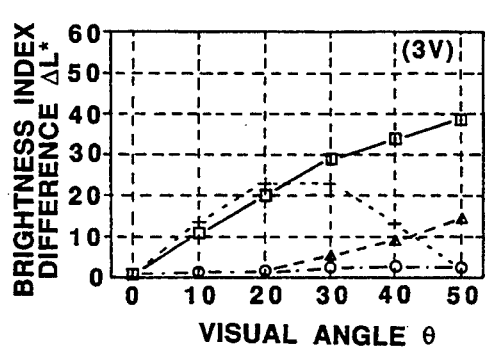
Figure 10C:
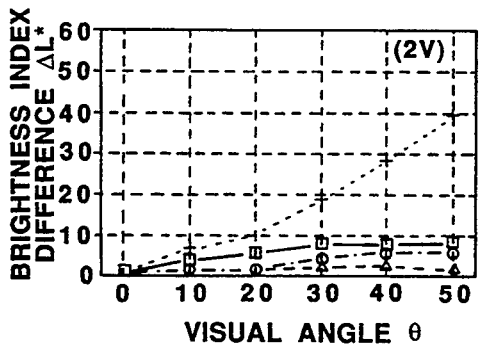
Figure 10F:
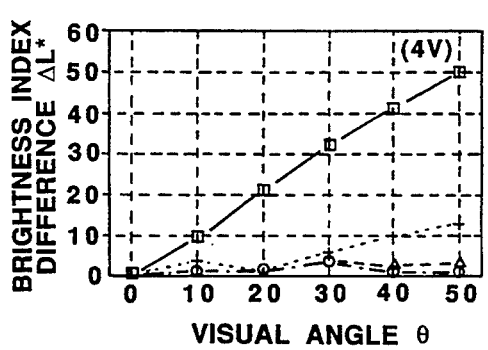
Figure 11A:
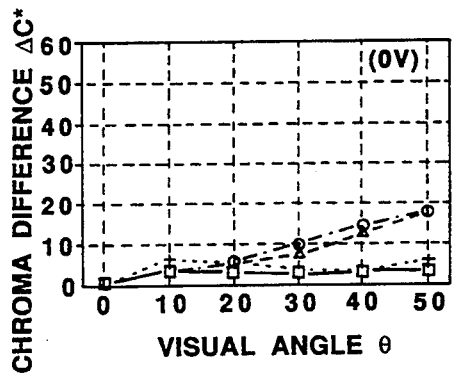
FIGS. 11A to 11F are graphs showing the visual angle dependence of chroma difference ΔC* for six different applied voltages and for different directions, respectively, in which the visual angle is changed in the liquid crystal display device of the first embodiment.
Figure 11D:
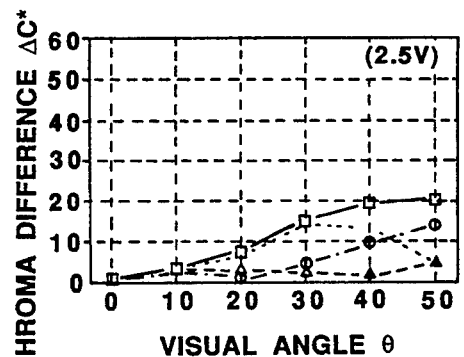
Figure 11B:
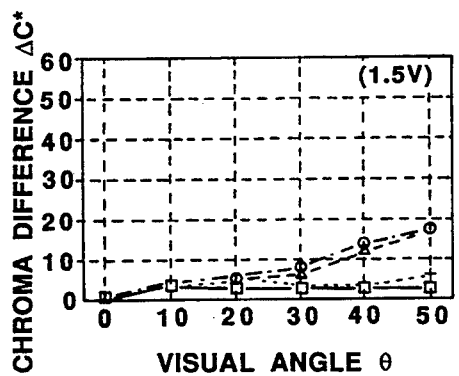
Figure 11E:
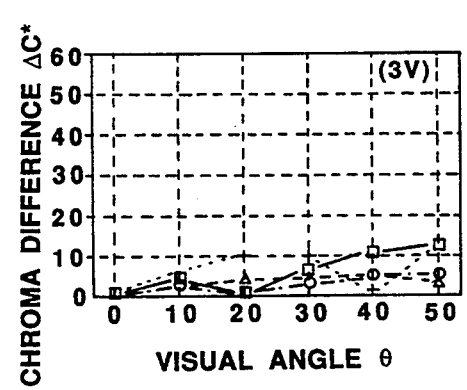
Figure 11C:
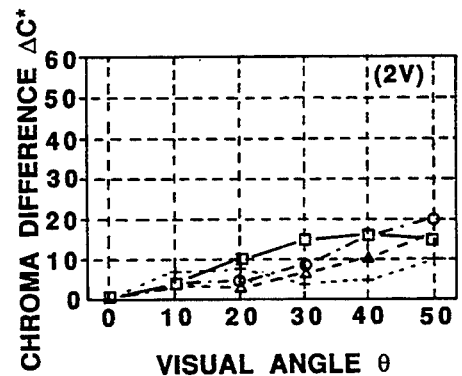
Figure 11F:
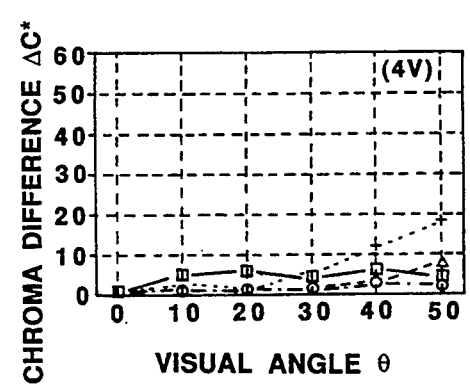

Actual results of measurement on the visual angle characteristics of the TN liquid crystal display device having the above-described arrangement will be described next in comparison with the conventional device. The liquid crystal display device of this embodiment is of a positive type and includes the polarizer whose transmission axis is set to be perpendicular to the incident-side aligning treatment direction of the liquid crystal cell. If, for example, the value Δn·d is 368.8 nm, and the thickness d is 64 μm, the refractive indexes $n_X$, $n_Y$, and $n_Z$ of the biaxial retardation plate 104 are set to be 1.5857, 1.5802, and 1.5836, respectively, while the ratio of ($n_Z - n_Y$) to ($n_X - n_Z$) is 34:21, i.e., about 6:4. Since polycarbonate as the material for the biaxial retardation plate 104 has a benzene ring in its structural formula, the retardation plate exhibits the wavelength dependence of Δn·d, as shown in FIG. 8.

FIGS. 9A to 9F, 10A to 10F, and 11A to 11F are graphs showing the visual angle dependence of a color difference ΔE*, a brightness index difference ΔL*, and a chroma difference ΔC* for six different applied voltages, respectively, in the liquid crystal display device of the first embodiment. The respective graphs show changes in color difference ΔE*, brightness index difference ΔL*, and chroma difference ΔC*, caused when a visual angle θ is changed in four directions, i.e., upward, downward, leftward, and downward directions (azimuth angles: 135°, 315°, 225°, 45°). The six different applied voltages are 0 V, 1.5 V, 2 V, 2.5 V, 3 V, and 4 V. In each graph, a white square (□), a plus (+), a white circle (○), and a white triangle (△) indicate values obtained when the visual angle is changed in the upward, downward, leftward, and rightward directions, respectively. The visual angle dependence of the respective values will be compared with that shown in FIGS. 3A to 5F.

In a bright display state in which the applied voltage falls within the range of 0 to 1.5 V, the visual angle dependence of the brightness index difference ΔL* in the upward and downward directions in the embodiment is lower than that in the prior art. In addition, the visual angle dependence of the chroma difference ΔC* in all the directions in the embodiment is lower than that in the prior art. Consequently, the visual angle dependence of the color difference ΔE* in all the directions in the embodiment is lower than that in the prior art.

In a halftone display state in which the applied voltage falls within the range of 1.5 to 3.0 V, the visual angle dependence of the chroma difference ΔC* in the leftward and rightward directions (azimuth angles: 225°, 45°) in the embodiment is lower than that in the prior art. Accordingly, the visual angle dependence of the color difference ΔE* in the leftward and rightward directions in the embodiment is lower than that in the prior art.

As described above, if one biaxial retardation plate is properly arranged between the liquid crystal cell and the analyzer as in the embodiment, the visual angle dependence of changes in color during a halftone display operation in the TN liquid crystal display device can be considerably improved as compared with the conventional TN liquid crystal display device. As a result, accurate gradation can be reliably displayed.

In the first embodiment, the light-transmitting axis 102a of the polarizer 102 is set to be perpendicular to the incident-side aligning treatment direction 107a of the liquid crystal cell. However, the present invention is not limited to this. The light-transmitting axis may be set to be parallel to the incident-side aligning treatment direction 107a.

[Second Embodiment]

In the second embodiment, two biaxial retardation plates are respectively arranged on the incident and exit sides of a TN liquid crystal cell to sandwich the cell. The same reference numerals in the second embodiment denote the same parts as in the first embodiment, and a description thereof will be omitted.

Figure 12:
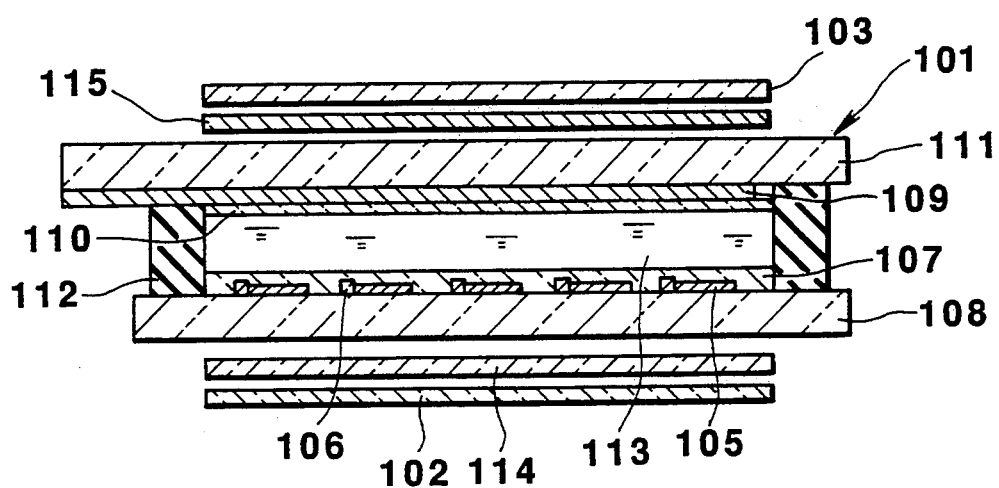
FIG. 12 is a sectional view showing a liquid crystal display device according to a second embodiment of the present invention.
Figure 13:
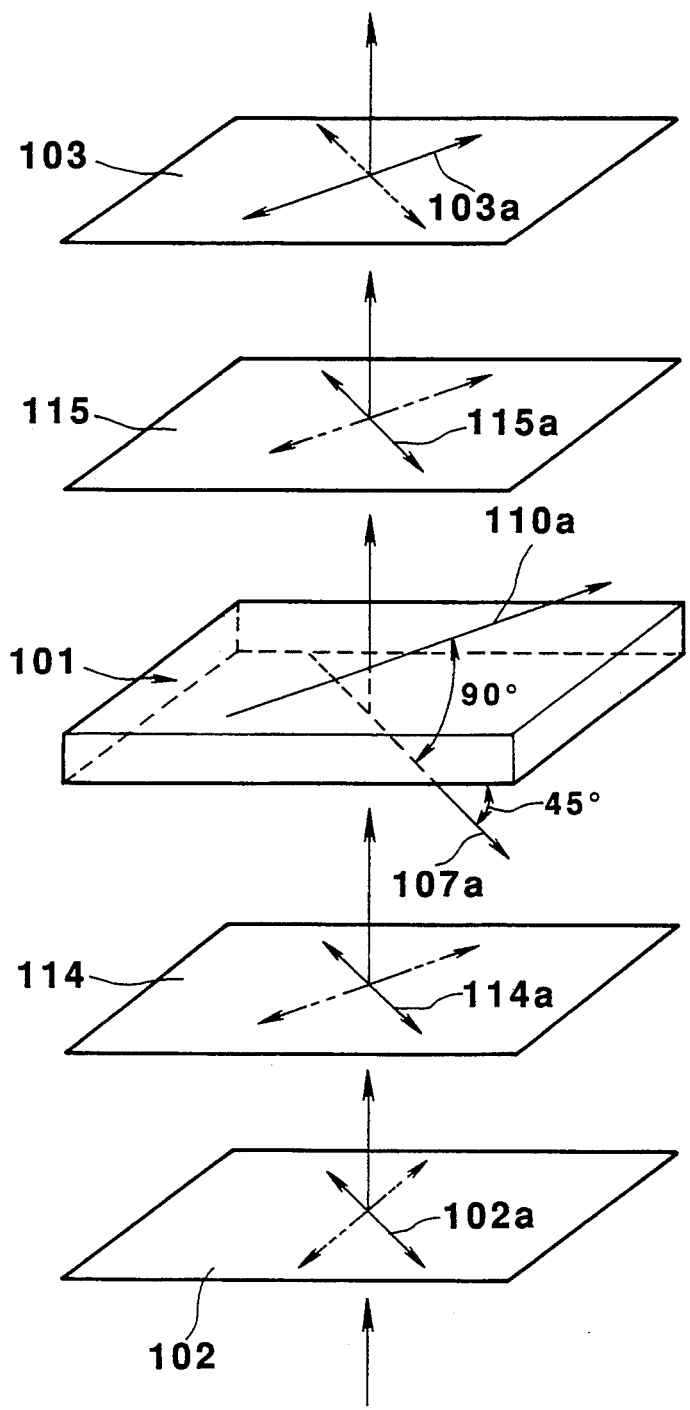
FIG. 13 is an exploded perspective view showing the schematic arrangement of the second embodiment.

FIGS. 12 and 13 are a sectional view and an exploded perspective view, respectively, of a liquid crystal display device of the second embodiment. As shown in FIG. 12, in the liquid crystal display device of this embodiment, biaxial retardation plates 114 and 115 are respectively arranged on the incident and exit sides of a liquid crystal cell 101 to sandwich the cell 101. In this case, the two biaxial retardation plates 114 and 115 are arranged such that a phase delay axis 114a of the first biaxial retardation plate 114 is parallel to an incident-side aligning treatment direction 107a of the liquid crystal cell 101, and a phase delay axis 115a of the second biaxial retardation plate 115 is parallel to the phase delay axis 114a of the first biaxial retardation plate 114. A polarizer 102 is arranged such that its light-transmitting axis 102a is parallel to the incident-side aligning treatment direction 107a. An analyzer 103 is arranged such that its transmission axis 103a is perpendicular to the light-transmitting axis 102a. Other arrangements are the same as those of the first embodiment.

Similar to the liquid crystal display device of the first embodiment, in the liquid crystal display device having the above-described arrangement, when beams which are obliquely and vertically transmitted through the liquid crystal cell 101 pass through the two biaxial retardation plates 114 and 115, differences in phase difference between the beams are corrected. As a result, the contrast in visual angle directions is increased, and the phenomenon of brightness inversion in halftone display can be suppressed. In addition, color change characteristics with respect to changes in visual angle in the leftward and rightward directions in half-tone display are improved as follows, and the visual angle characteristics as those of a display can be greatly improved.

Figure 1:
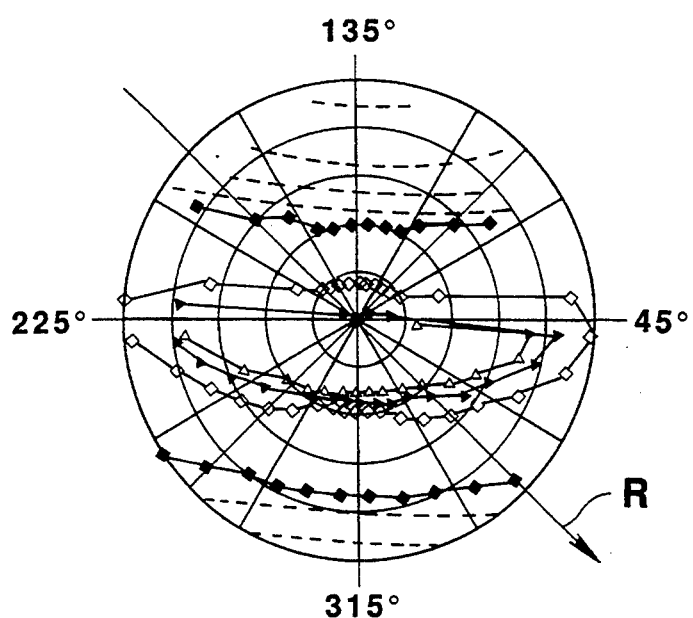
FIG. 1 is an equi-contrast curve chart in a conventional liquid crystal display device.
Figure 14:
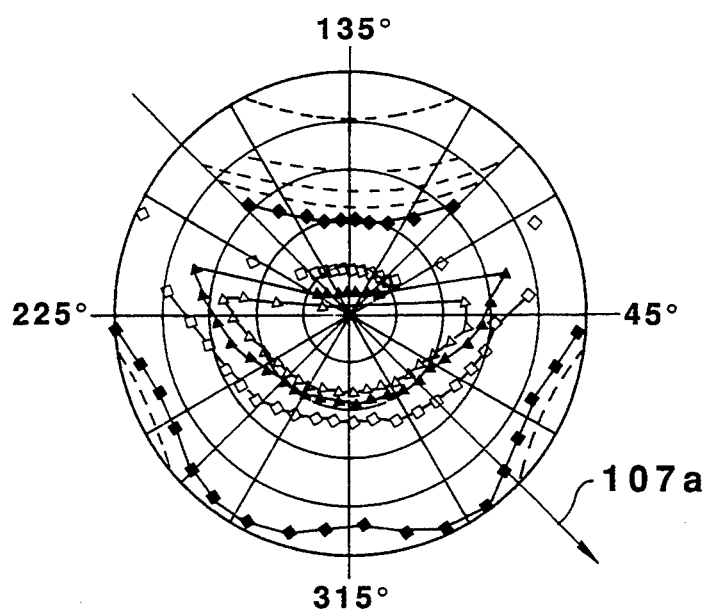
FIG. 14 is an equi-contrast curve chart in the liquid crystal display device of the second embodiment.

FIG. 14 show equi-contrast curves obtained when applied voltages are set as V=0 [V] and V=4.38 [V] in the liquid crystal display device of the second embodiment. In FIG. 14, similar to FIG. 1, the concentric circles respectively represent, from the innermost circle, visual angles of 10°, 20°, 30°, 40°, and 50° with respect to the normal direction of a substrate of the liquid crystal display device. In addition, each black square ( ) represents that the contrast is 10; each white square (□), 50; each black triangle ( ), 100; and each white triangle (Δ), 150. As is apparent from comparison between the equi-contrast curves in FIG. 14 and those in FIG. 1, based on the conventional TN liquid crystal display device, the viewing angles of the liquid crystal cell 101 of the embodiment in the leftward and rightward directions (corresponding to azimuth angles of 45° and 225°) are slightly smaller than those of the liquid crystal cell of the prior art, but the viewing angle of the liquid crystal cell 101 in the downward direction (corresponding to an azimuth angle of 315°) is increased.

Figure 2A:
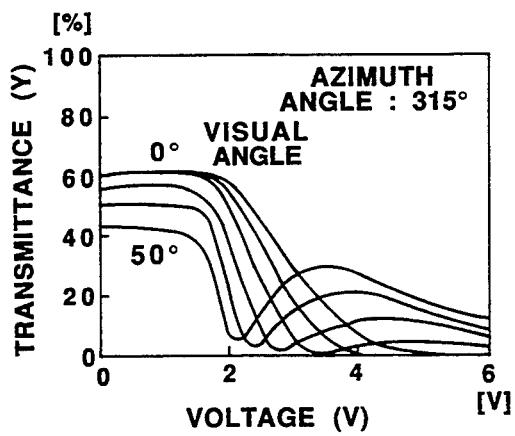
FIGS. 2A to 2D are Y-V graphs showing characteristics based on a transmittance Y and an applied voltage V for different azimuth angles and for different directions, respectively, in which the visual angle is changed in the conventional liquid crystal display device.
Figure 2B:
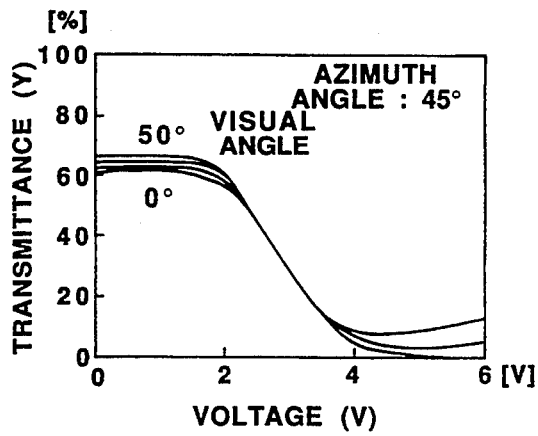
Figure 2C:
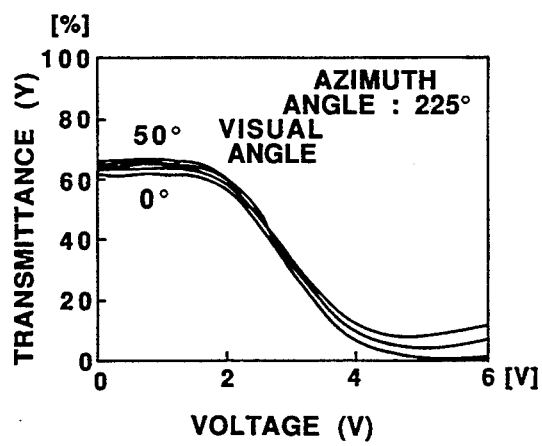
Figure 2D:
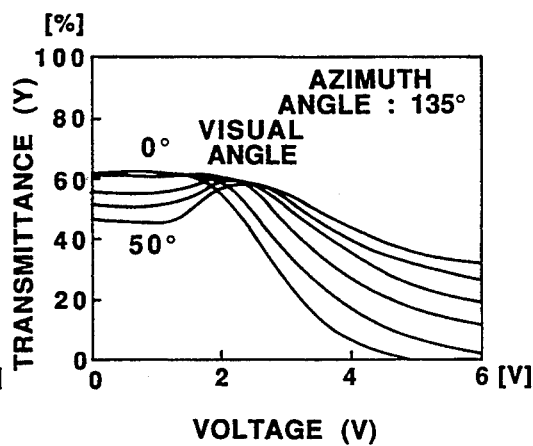
Figure 3A:
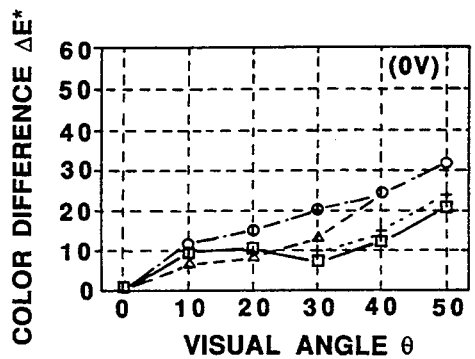
FIGS. 3A to 3F are graphs showing the visual angle dependence of a color difference ΔE* for six different applied voltages and for different directions, respectively, in which the visual angle is changed in the conventional liquid crystal display device.
Figure 3D:
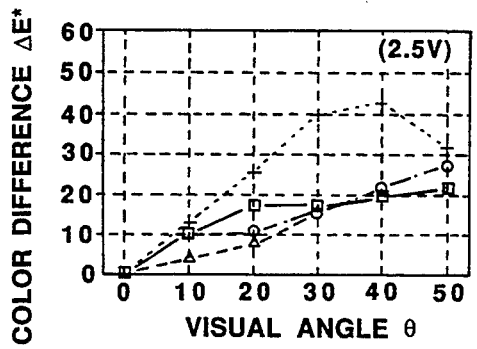
Figure 3B:
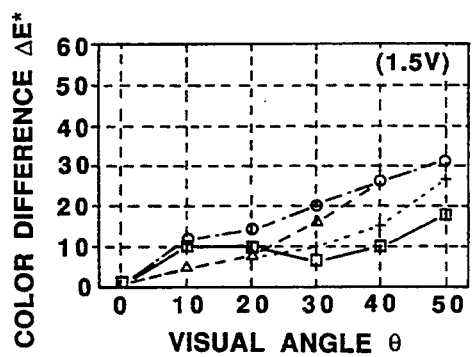
Figure 3E:
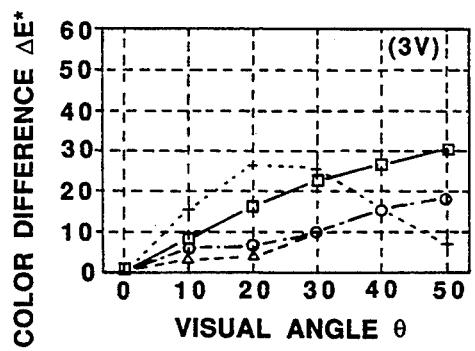
Figure 3C:
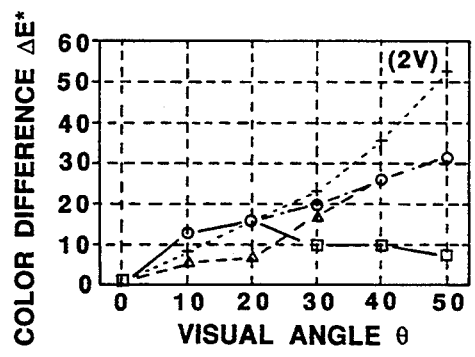
Figure 3F:
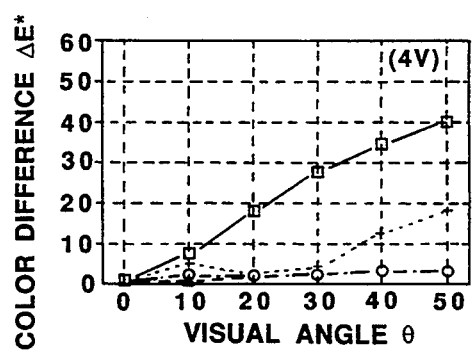
Figure 4A:
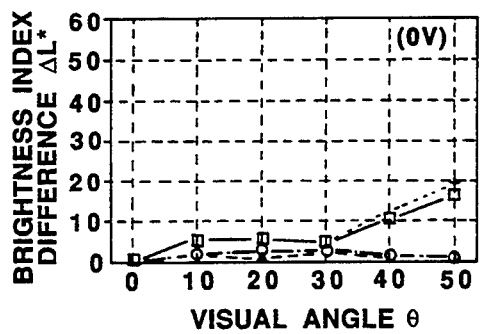
FIGS. 4A to 4F are graphs showing the visual angle dependence of a brightness index difference ΔL* for six different applied voltages and for different directions, respectively, in which the visual angle is changed in the conventional liquid crystal display device.
Figure 4D:
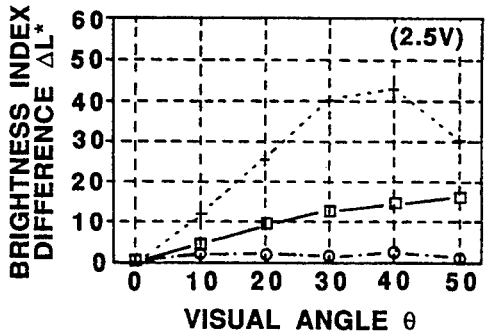
Figure 4B:
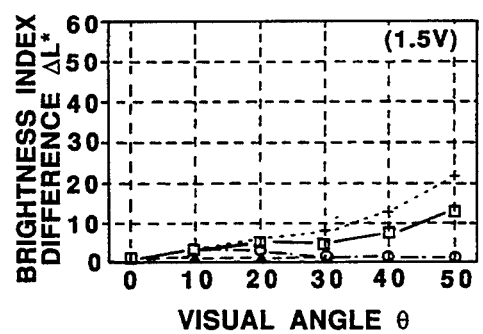
Figure 4E:
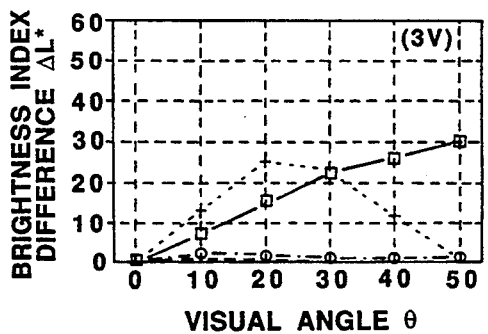
Figure 4C:
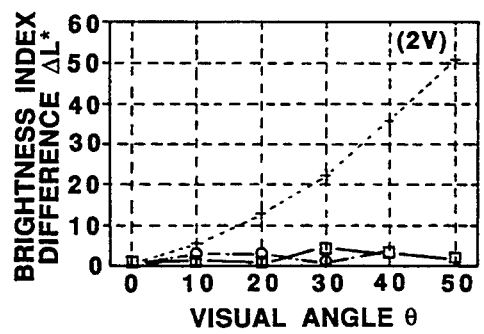
Figure 4F:
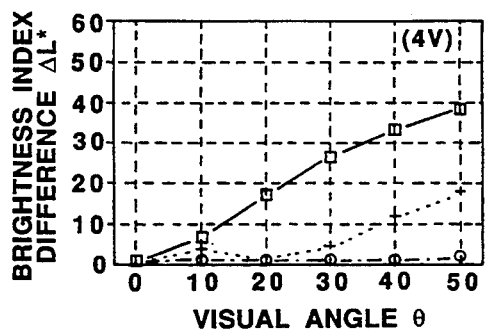
Figure 5A:
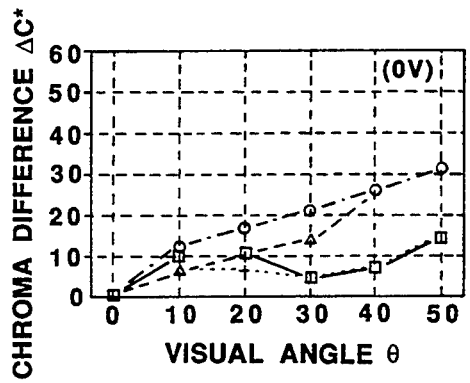
FIGS. 5A to 5F are graphs showing the visual angle dependence of a chroma difference ΔC* for six different applied voltages and for different directions, respectively, in which the visual angle is changed in the conventional liquid crystal display device.
Figure 5D:
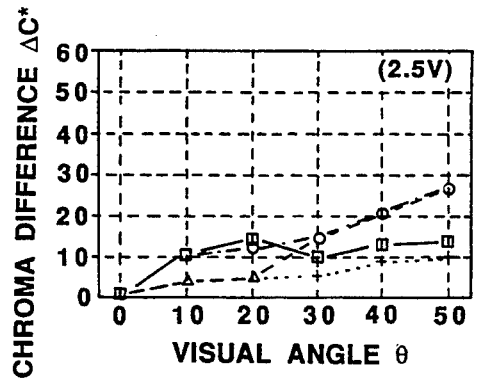
Figure 5B:
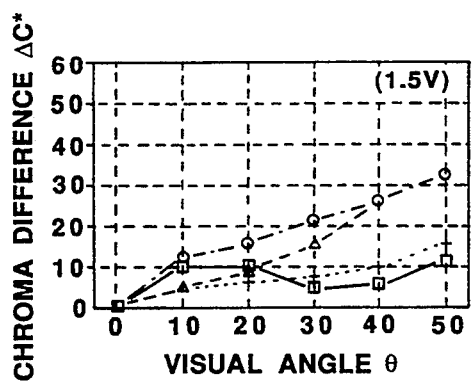
Figure 5E:
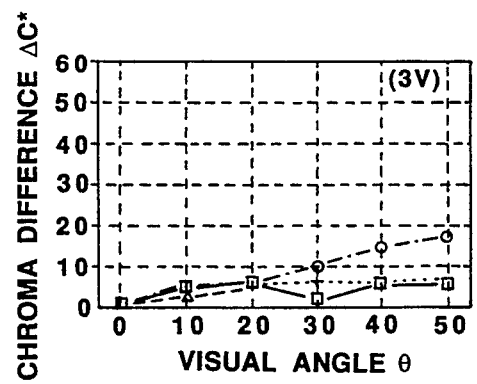
Figure 5C:
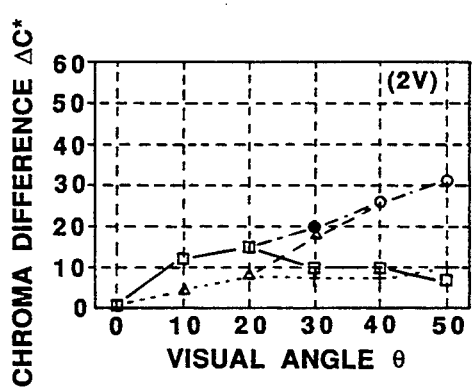
Figure 5F:
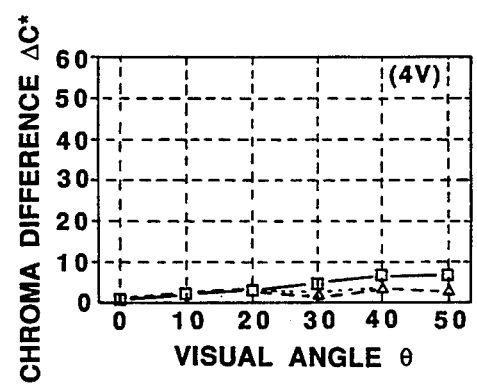
Figure 15A:
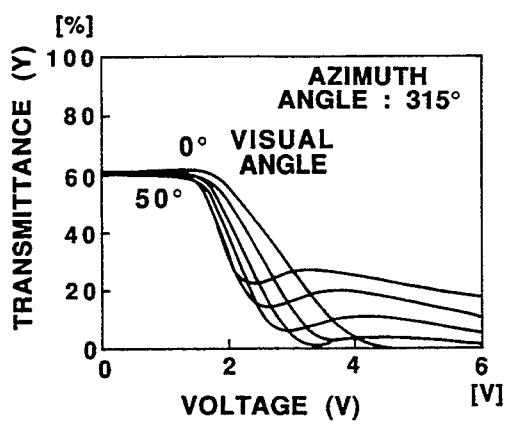
FIGS. 15A to 15D are Y-V graphs showing characteristics based on a transmittance Y and an applied voltage V for different azimuth angles and for different directions, respectively, in which the visual angle is changed in the liquid crystal display device of the second embodiment.
Figure 15B:
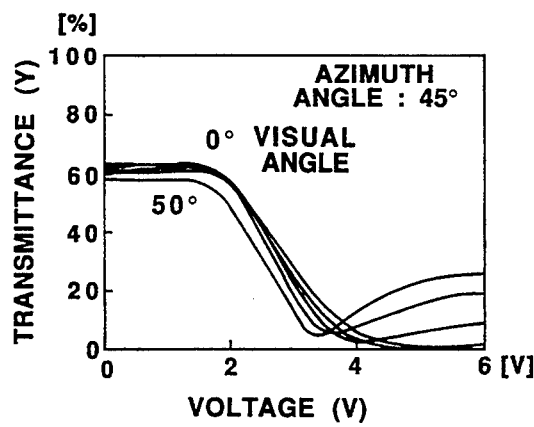
Figure 15C:
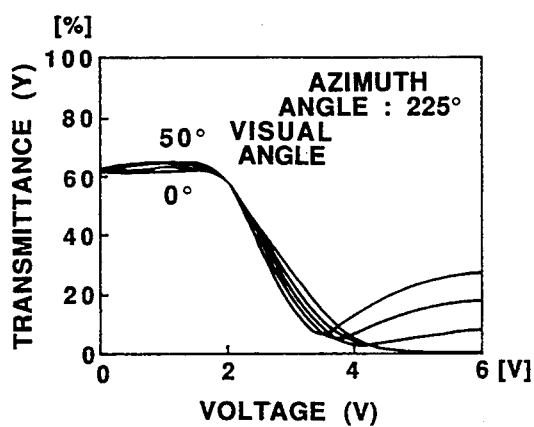
Figure 15D:
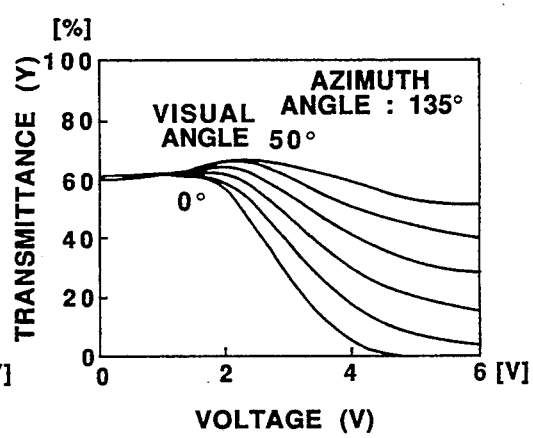
Figure 16A:
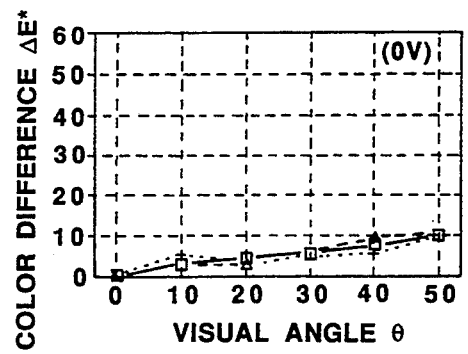
FIGS. 16A to 16F are graphs showing the visual angle dependence of a color difference ΔE* for six different applied voltages and for different directions, respectively, in which the visual angle is changed in the liquid crystal display device of the second embodiment.
Figure 16D:
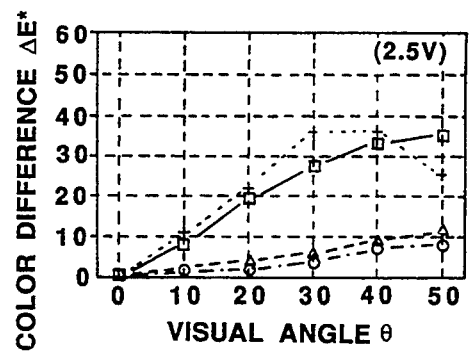
Figure 16B:
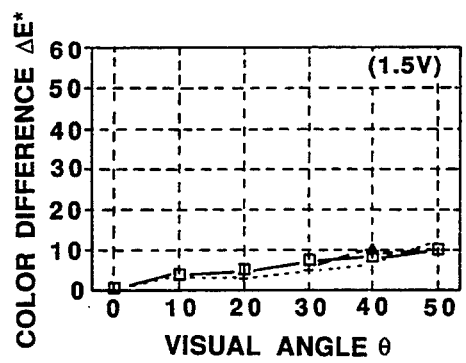
Figure 16E:
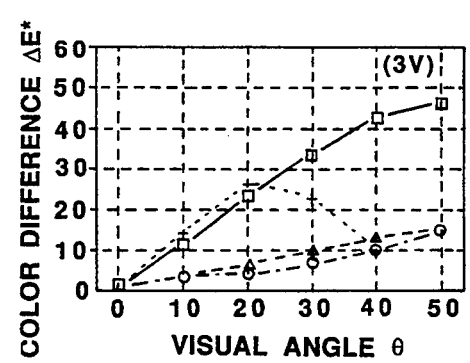
Figure 16C:
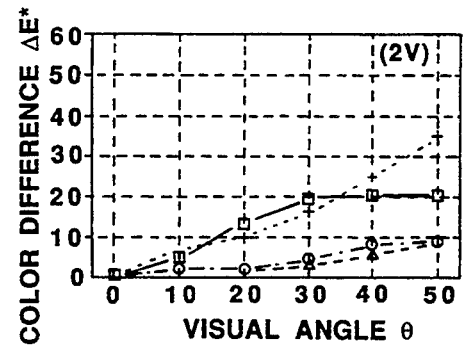
Figure 16F:
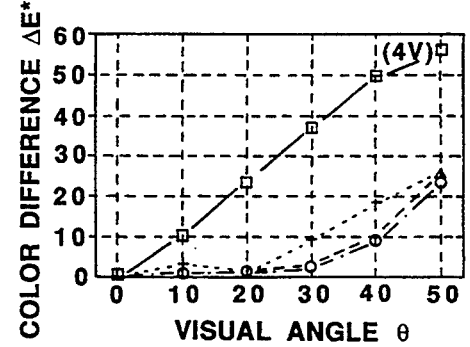
Figure 17A:
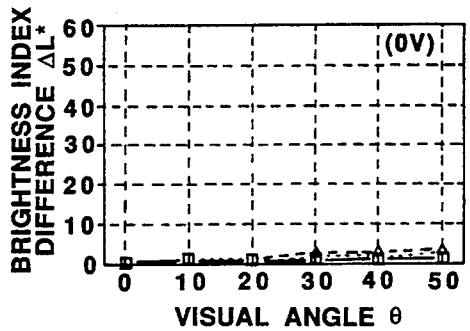
FIGS. 17A to 17F are graphs showing the visual angle dependence of a brightness index difference ΔL* for six different applied voltages and for different directions, respectively, in which the visual angle is changed in the liquid crystal display device of the second embodiment.
Figure 17D:
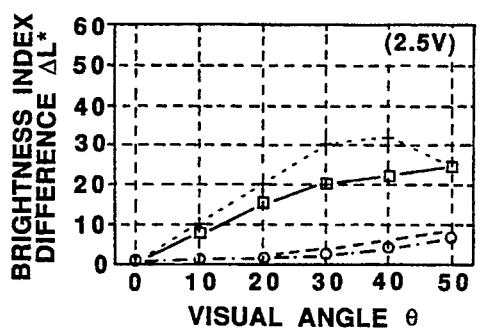
Figure 17B:
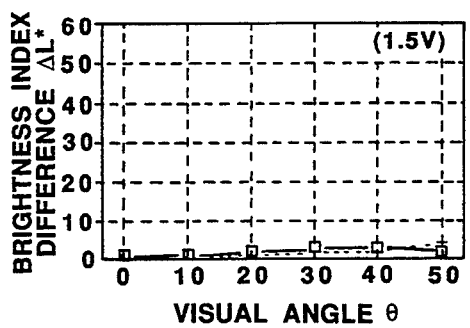
Figure 17E:
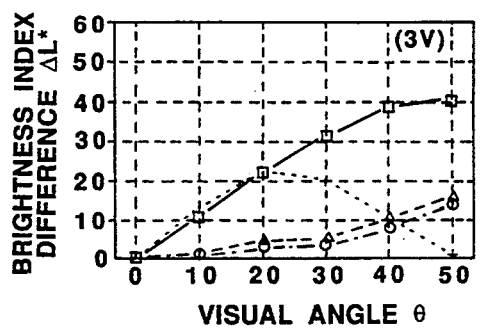
Figure 17C:
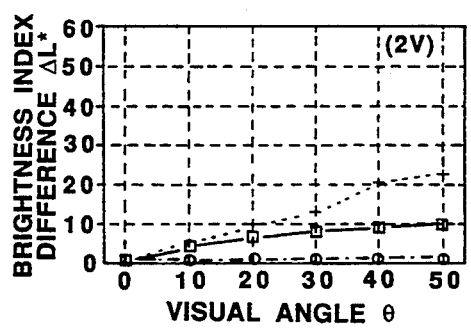
Figure 17F:
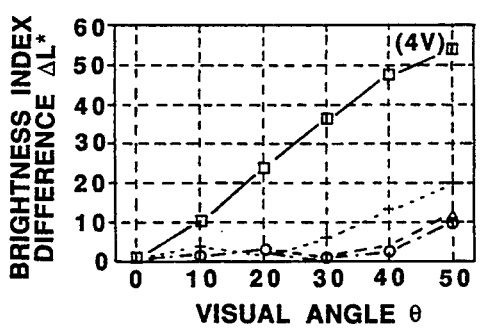
Figure 18A:
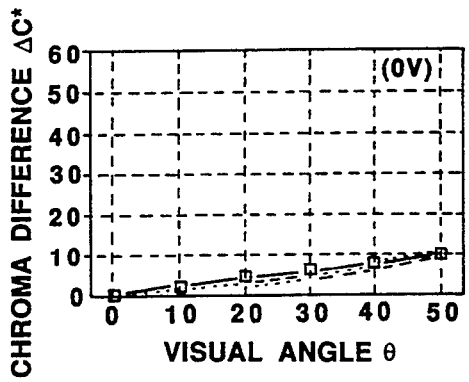
FIGS. 18A to 18F are graphs showing the visual angle dependence of chroma difference ΔC* for six different applied voltages and for different directions, respectively, in which the visual angle is changed in the liquid crystal display device of the second embodiment.
Figure 18D:
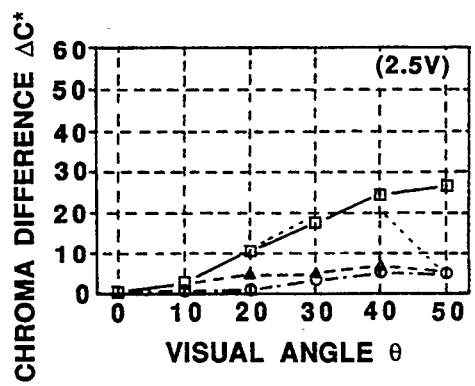
Figure 18B:
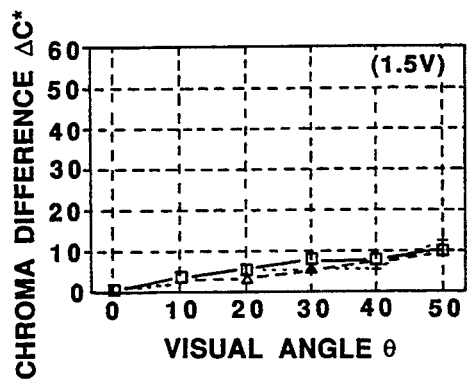
Figure 18E:
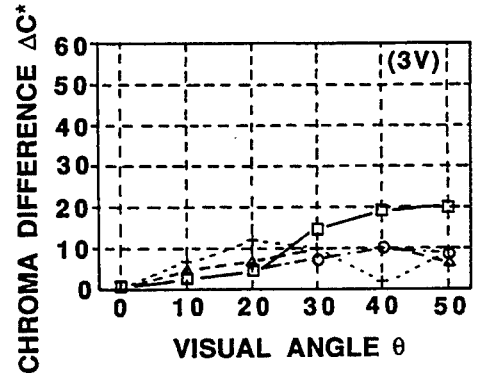
Figure 18C:
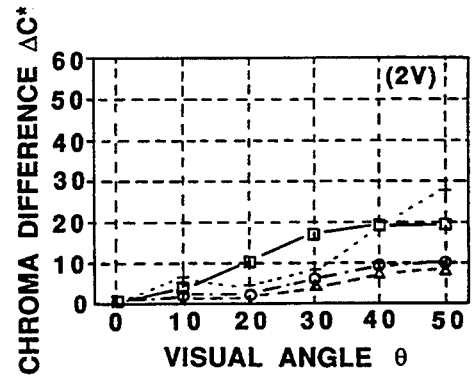
Figure 18F:
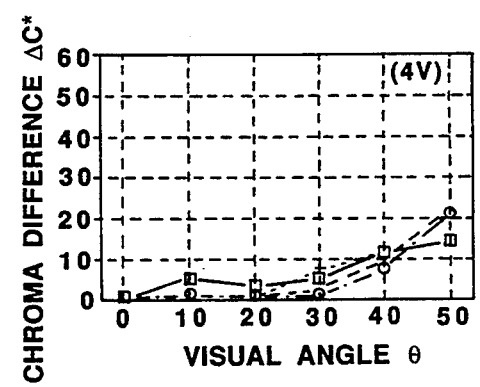

FIGS. 15A to 15D respectively show the visual angle dependence of Y-V curves showing the relationships between transmittances Y and applied voltages V in the respective directions. FIG. 15A show Y-V curves obtained when the visual angle is changed within the range of 0° to 50° in the downward direction (corresponding to an azimuth angle of 315°) of the liquid crystal cell 101. In comparison with the curves in FIG. 2A, the negative going peaks of the curves in FIG. 15A are raised to be moderated, and decreases in the value Y during a period in which no voltage is applied are small. As shown in FIG. 15D, when the visual angle is changed in the upward direction (corresponding to an azimuth angle of 135°) of the liquid crystal cell 101, changes in the value Y during a period in which no voltage is applied are small.

FIGS. 16A to 16F, 17A to 17F, and 18A to 18F are graphs showing the visual angle dependence of a color difference $\Delta E^*$, a brightness index difference $\Delta L^*$, and a chroma difference $\Delta C^*$ for six different applied voltages, respectively, in the liquid crystal display device of the second embodiment. In this case, the graphs respectively show changes in color difference $\Delta E^*$, brightness index difference $\Delta L^*$, and chroma difference $\Delta C^*$, caused when a visual angle $\theta$ is changed in the four directions, i.e., the upward, downward, leftward, and rightward directions (corresponding to azimuth angles of 135°, 315°, 225°, and 45°). The six different applied voltages are 0 V, 1.5 V, 2 V, 2.5 V, 3 V, and 4 V. In each graph, a white square (□), a plus (+), a white rhombus ( ), and a white triangle (Δ) indicate values obtained when the visual angle is changed in the upward, downward, leftward, and rightward directions, respectively. The visual angle dependence shown in these graphs will be compared with that shown in FIGS. 3A to 5F, based on the conventional liquid crystal display device.

In a bright display state in which the applied voltage falls within the range of 0.0 V to 1.5 V, since both the brightness index difference and chroma difference characteristics are improved in all the four directions, the visual angle dependence of differences in color is greatly suppressed as compared with that in the prior art. The visual angle dependence of the color differences $\Delta E^*$ in the second embodiment is slightly lower than that in the first embodiment in the three directions excluding the upward direction, i.e., the leftward, rightward, and downward directions.

In a halftone display state in which the applied voltage falls within the range of 1.5 V to 3.0 V, since the chroma difference characteristics are improved, the visual angle dependence of differences in color in the leftward and rightward directions, i.e., the directions corresponding to azimuth angles of 225° and 45°, are improved more than that in other directions. In this case, the visual angle dependence of the color differences $\Delta E^*$ in the second embodiment is almost the same as that in the first embodiment.

As described above, according to the liquid crystal display device of the second embodiment, the contrast in visual angle directions is increased, and the phenomenon of brightness inversion in halftone display can be suppressed. In addition, changes in color with changes in visual angle in the leftward and rightward directions in halftone display are suppressed, and the visual angle characteristics are improved more than that in the first embodiment, thus allowing more reliable gradation display.

In the above-described embodiment, the value $\Delta n \cdot d$ of the liquid crystal cell falls within the range of 350 to 550 nm, and the value $\Delta n \cdot d$ of each biaxial retardation plate falls within the range of 300 to 400 nm. However, the present invention is not limited to this. Even if the value $\Delta n \cdot d$ of the liquid crystal cell falls within the range of 350 to 700 nm, and the value $\Delta n \cdot d$ of each biaxial retardation plate falls within the range of 200 to 600 nm, the visual angle characteristics can be improved in the same manner as in the above-described embodiment.

[Third Embodiment]

In the third embodiment, two biaxial retardation plates are arranged on the exit side of a liquid crystal cell.

Figure 19:
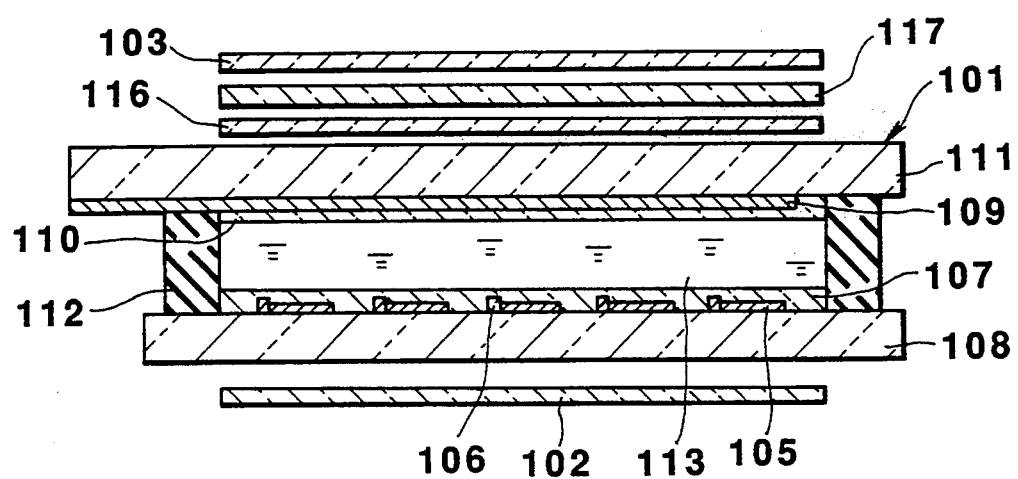
FIG. 19 is a sectional view showing a liquid crystal display device according to a third embodiment of the present invention.
Figure 20:
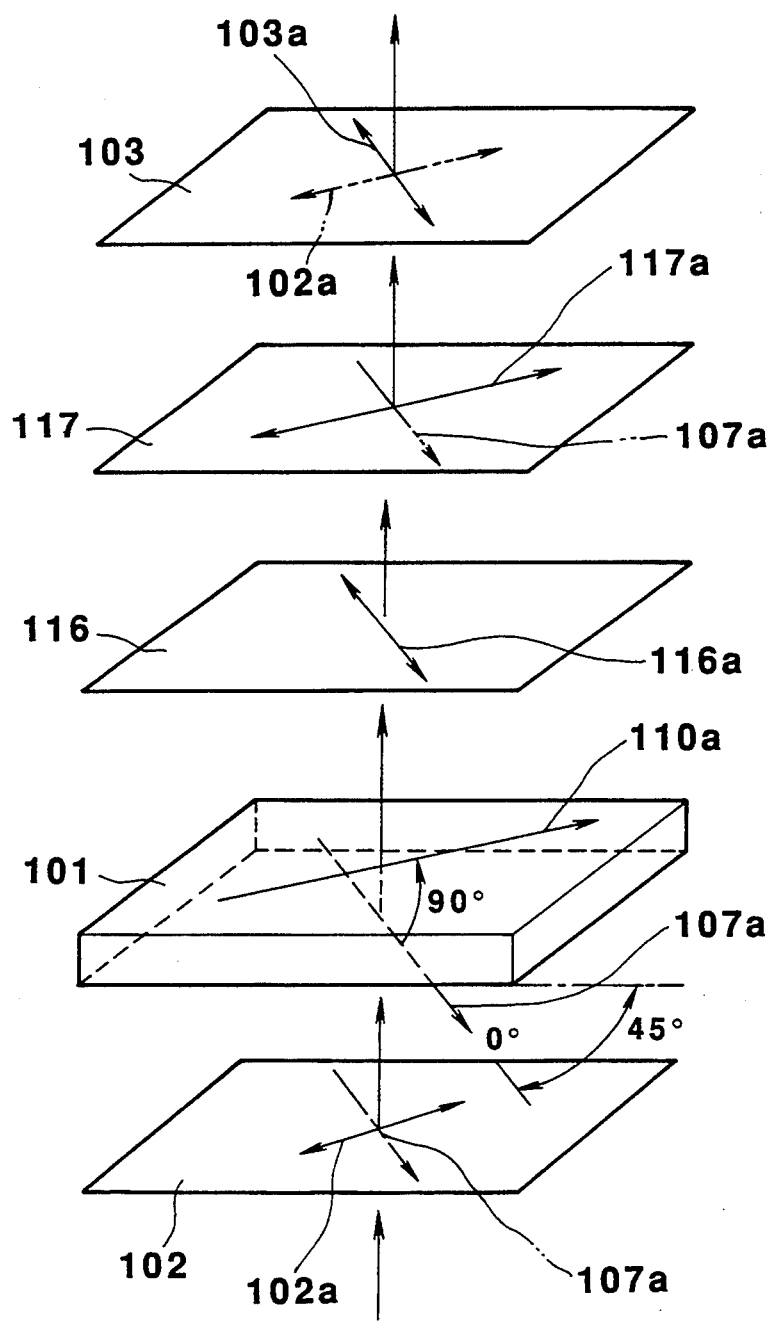
FIG. 20 is an exploded perspective view showing the schematic arrangement of the third embodiment.

FIGS. 19 and 20 are a sectional view and an exploded perspective view, respectively, of a liquid crystal display device according to the second embodiment of the present invention. In this liquid crystal display device, a polarizer 102 and an analyzer 103 are respectively arranged on the incident and exit sides of a twisted nematic liquid crystal cell 101, and first and second biaxial retardation plates 116 and 117 are arranged between the liquid crystal cell 101 and the analyzer 103 in the order named from the liquid crystal cell 101 side.

Aligning films 107 and 110 respectively formed on an incident-side substrate 108 and an exit-side substrate 111 have undergone aligning treatment such as rubbing. More specifically, aligning treatment is performed with respect to the aligning film 107 on the incident-side substrate 108 in a direction 107a inclined at about 45° from the upper left to the lower right of the liquid crystal cell 101 whose longitudinal direction is parallel to the horizontal direction, when viewed from the front surface side (exit side) of the liquid crystal cell 101, as shown in FIG. 20. Aligning treatment is performed with respect to the aligning film 110 on the exit-side substrate 111 in a direction 110a rotated in a clockwise direction through about 90° with respect to an incident-side aligning treatment direction 107a. With such aligning treatment, the molecules of a liquid crystal material 113 are twisted at about 90° clockwise, when viewed from the exit side. The liquid crystal material 113 has a ratio d/p of a gap d to a natural pitch p=about 0.05, and the liquid crystal molecules are aligned at a pretilt angle of about 1°. A product $\Delta n \cdot d$ of a gap d and a refractive index anisotropy $\Delta n$ of the liquid crystal cell 101 preferably falls within the range of 350 to 700 nm and is preferably set to be 380 nm (measurement wavelength: 589 nm).

The polarizer 102 is arranged such that its light-transmitting axis 102a is almost perpendicular to the incident-side aligning treatment direction 107a of the liquid crystal cell 101. The analyzer 103 is arranged such that its light-transmitting axis 103a is almost perpendicular to the light-transmitting axis 102a of the polarizer 102.

Each of the first and second biaxial retardation plates 116 and 117 is composed of polycarbonate and has a refractive index $n_X$ in the extending direction, a refractive index $n_Y$ in the direction perpendicular to the extending direction, and a refractive index $n_Z$ in the direction of thickness. These refractive indexes in the three directions satisfy a relation $n_Y < n_Z < n_X$. The extending direction coincides with the phase delay axis of each biaxial retardation plate. A product $\Delta n \cdot d$ of $\Delta n$ ($=n_X-n_Y$) and a thickness d of the biaxial retardation plate 104 falls within the range of 200 to 600 nm, and is preferably set to be 365 nm (measurement wavelength: 589 nm). The first biaxial retardation plate 116 is arranged such that its phase delay axis 116a in the extending direction is almost parallel to the incident-side aligning treatment direction 107a. The second biaxial retardation plate 117 is arranged such that its phase delay axis 117a is almost perpendicular to the phase delay axis 116a of the first biaxial retardation plate 116.

In the third embodiment, since the first and second biaxial retardation plates 116 and 117 each have the refractive indexes in the three directions, which satisfy $n_Y < n_Z < n_X$, differences in phase difference between light obliquely transmitted through the liquid crystal cell 101 and light vertically transmitted therethrough are corrected by the two biaxial retardation plates 116 and 117. Consequently, the phenomenon of brightness inversion in halftone display can be suppressed, and the visual angle dependence of changes in color in the leftward and rightward direction in halftone display is reduced, thus greatly improving the visual angle characteristics.

The visual angle characteristics of the TN liquid crystal display device having the above-described arrangement will be described next in comparison with the conventional device when the value $\Delta n \cdot d$ is 368.8 nm, and the thickness d is 64 μm, the refractive indexes $n_X$, $n_Y$, and $n_Z$ of each of the first and second biaxial retardation plates 116 and 117 used in the liquid crystal display device of the third embodiment are set to be 1.5857, 1.5802, and 1.5836, respectively, while the ratio of $(n_Z-n_Y)$ to $(n_X-n_Z)$ is 34:21, i.e., about 6:4. Each of the biaxial retardation plates 116 and 117 is composed of polycarbonate.

Figure 21:
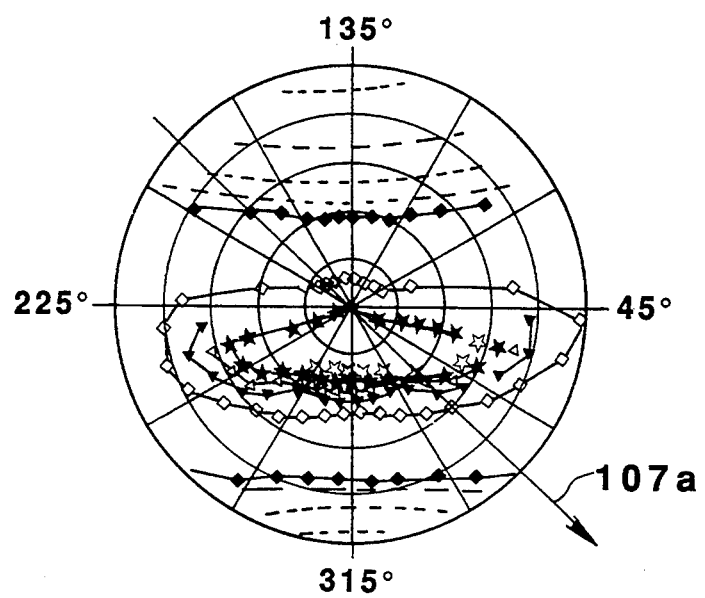
FIG. 21 is an equi-contrast curve chart in the liquid crystal display device of the third embodiment.

FIG. 21 show equi-contrast curves obtained when applied voltages are set as V=0 [V] and V=4.38 [V] in the liquid crystal display device using the above-described first and second biaxial retardation plate. In FIG. 21, the concentric circles respectively represent, from the innermost circle, visual angles of 10°, 20°, 30°, 40°, and 50° with respect to the normal direction of a substrate of the liquid crystal display device. In addition, each black square ( ) represents that the contrast is 10; each white square (□), 50; each black triangle ( ), 100; and each white triangle (Δ), 150. The shapes of the equi-contrast curves shown in FIG. 21 are similar to those shown in FIG. 1, based on the conventional liquid crystal display device.

Figure 22A:
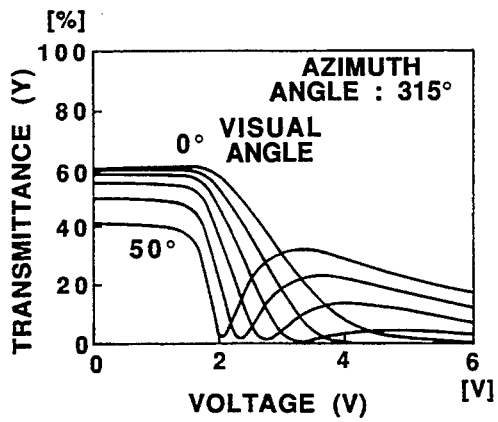
FIGS. 22A to 22D are Y-V graphs showing characteristics based on a transmittance Y and an applied voltage V for different azimuth angles and for different directions, respectively, in which the visual angle is changed in the liquid crystal display device of the third embodiment.
Figure 22B:
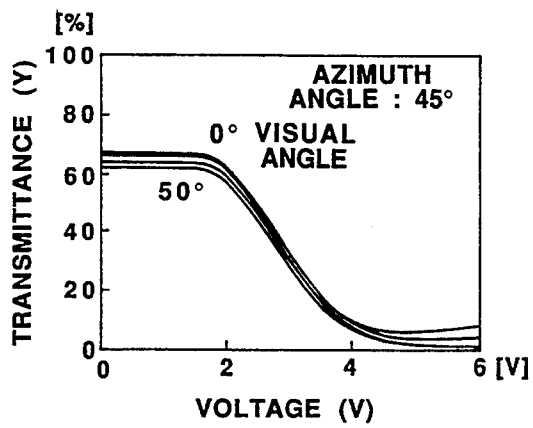
Figure 22C:
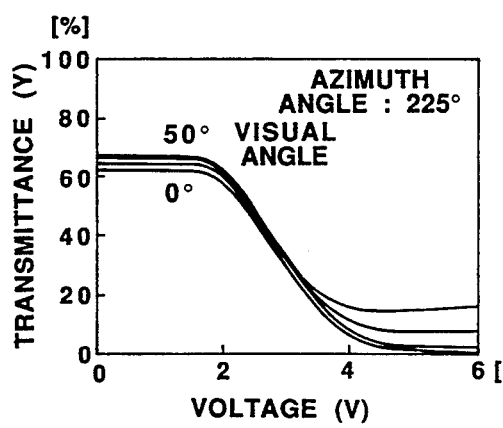
Figure 22D:
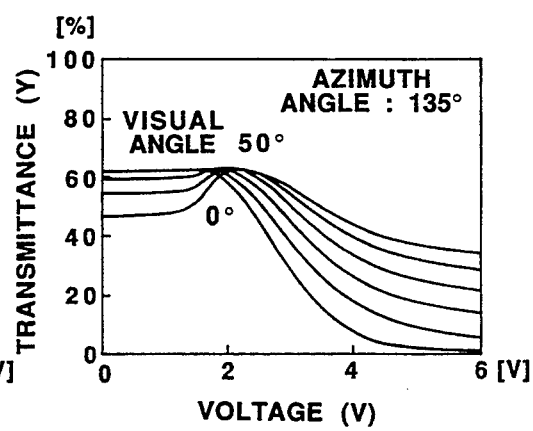
Figure 23A:
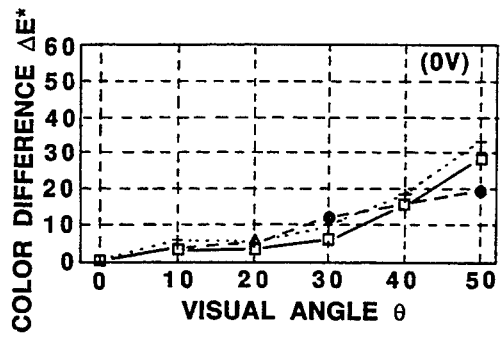
FIGS. 23A to 23F are graphs showing the visual angle dependence of a color difference ΔE* for six different applied voltages and for different directions, respectively, in which the visual angle is changed in the liquid crystal display device of the third embodiment.
Figure 23D:
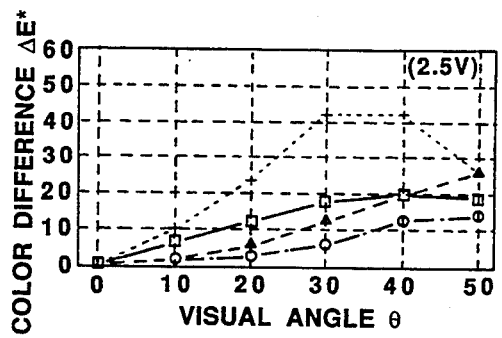
Figure 23B:
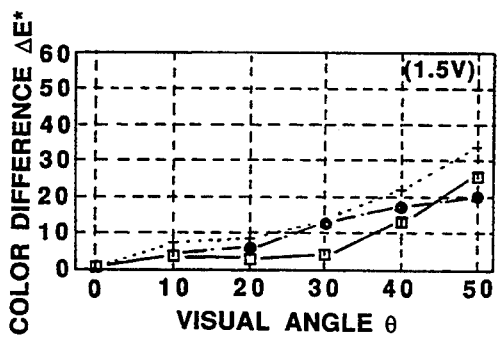
Figure 23E:
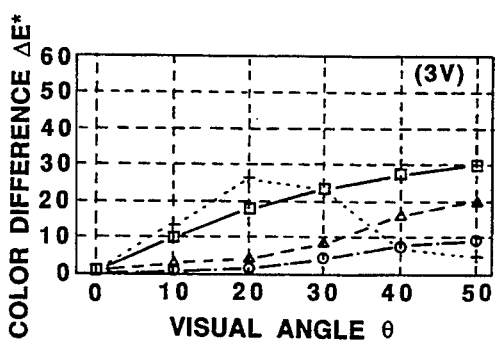
Figure 23C:
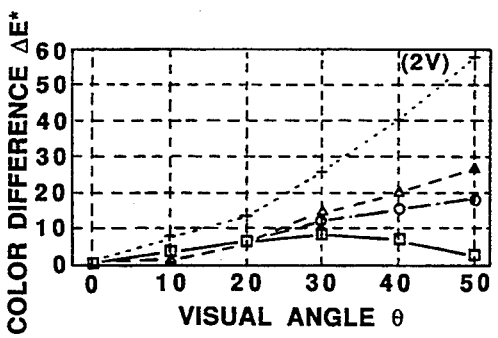
Figure 23F:
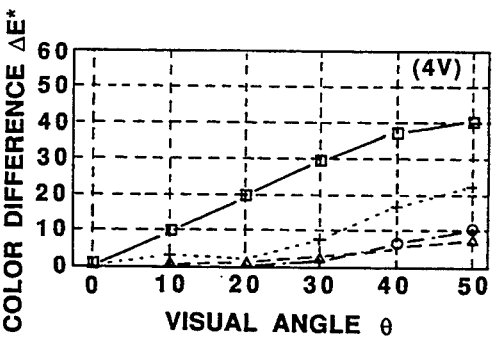
Figure 24A:
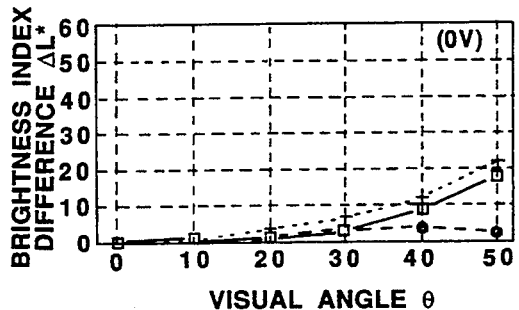
FIGS. 24A to 24F are graphs showing the visual angle dependence of a brightness index difference ΔL* for six different applied voltages and for different directions, respectively, in which the visual angle is changed in the liquid crystal display device of the third embodiment.
Figure 24B:
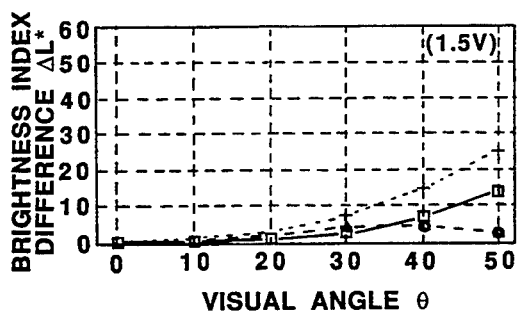
Figure 24C:
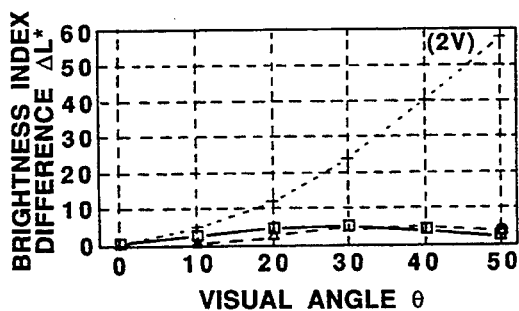
Figure 24D:
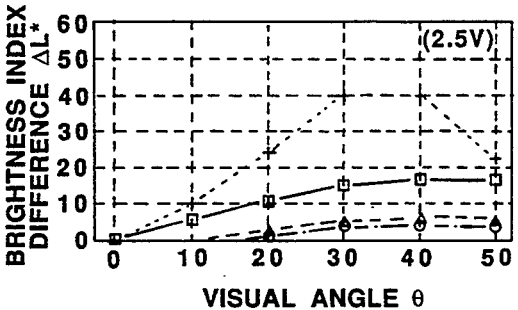
Figure 24E:
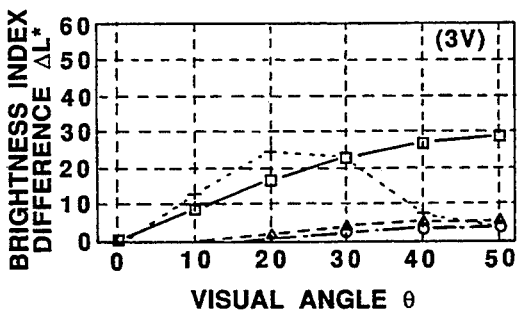
Figure 24F:
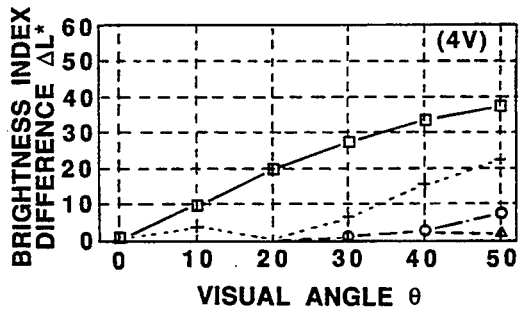
Figure 25A:
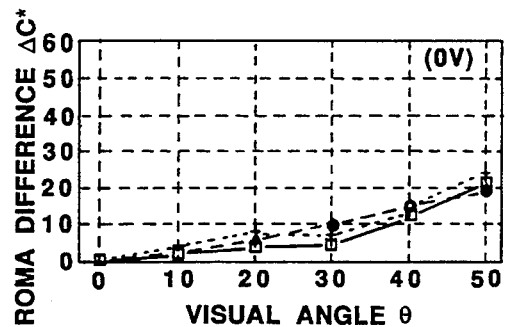
FIGS. 25A to 25F are graphs showing the visual angle dependence of chroma difference ΔC* for six different applied voltages and for different directions, respectively, in which the visual angle is changed in the liquid crystal display device of the third embodiment.
Figure 25D:
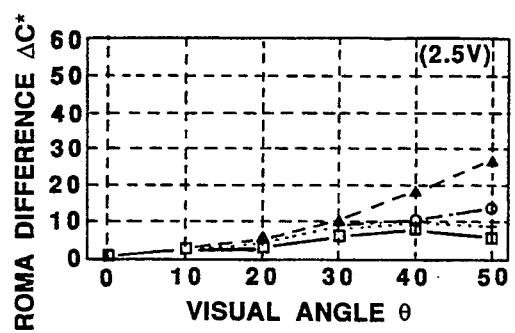
Figure 25B:
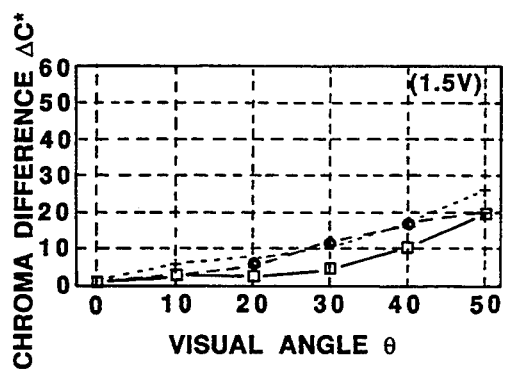
Figure 25E:
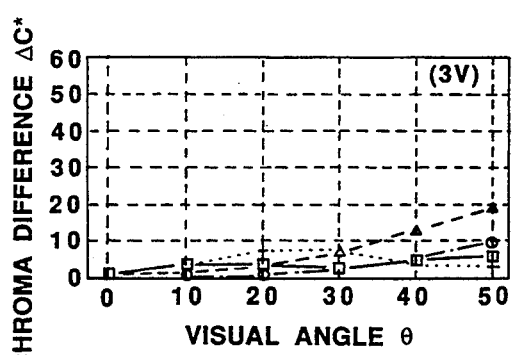
Figure 25C:
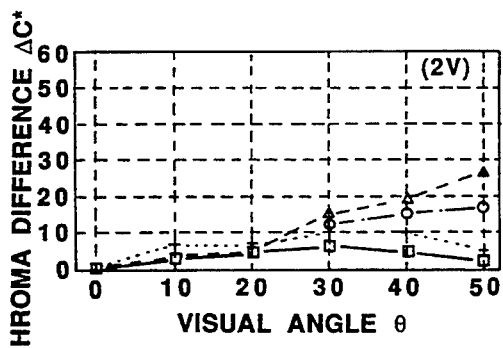
Figure 25F:
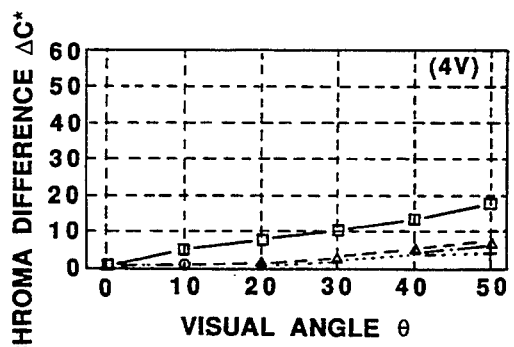

FIGS. 22A to 22D show the visual angle dependence of respective Y-V curves in the liquid crystal display device of the third embodiment. FIG. 22A show Y-V curves obtained when the visual angle is changed within the range of 0° to 50° in the downward direction (corresponding to an azimuth angle of 315°) of the liquid crystal cell 101. Similarly, FIGS. 22B, 22C, and 22D show Y-V curves obtained when the visual angle is changed within the range of 0° to 50° in the leftward, rightward, and upward directions (corresponding to azimuth angles of 315°, 45°, and 225°) of the liquid crystal cell 101, respectively. As is apparent from comparison between the Y-V curves in FIGS. 22A to 22D and the equivalent Y-V curves in FIG. 2A to 2D, based on the conventional liquid crystal display device, the visual angle dependence of the Y-V curves in the liquid crystal display device of the embodiment is almost the same as that in the conventional liquid crystal display device.

FIGS. 23A to 23F, 24A to 24F, and 25A to 125F are graphs showing the visual angle dependence of a color difference $\Delta E^*$, a brightness index difference $\Delta L^*$, and a chroma difference $\Delta C^*$ in the four directions, i.e., the upward, downward, leftward, and rightward directions (corresponding to azimuth angles of 135°, 315°, 225°, and 45°) for six different applied voltages, respectively, in the liquid crystal display device of the third embodiment. In this case, the six different applied voltages are 0 V, 1.5 V, 2 V, 2.5 V, 3 V, and 4 V. In each graph, a white square (□), a plus (+), a white circle (○), and a white triangle (Δ) indicate values obtained when the visual angle is changed in the upward, downward, leftward, and rightward directions, respectively. The visual angle dependence shown in these graphs will be compared with that shown in FIGS. 3A to 5F, based on the conventional liquid crystal display device.

In a bright display state in which the applied voltage falls within the range of 0.0 V to 1.5 V, the visual angle dependence of differences in chroma in the liquid crystal display device of the embodiment is suppressed more than that in the prior art. For this reason, the visual angle dependence of differences in color in the leftward and rightward directions corresponding to azimuth angles of 225° and 45° in the liquid crystal display device of the embodiment is improved more than that in the prior art. In addition, in a halftone display state in which the applied voltage falls within the range of 1.5 to 3.0 V, since the visual angle dependence of differences in chroma is improved, the visual angle dependence of differences in color in the leftward and rightward directions corresponding to azimuth angles of 225° and 45° (especially the leftward direction corresponding to an azimuth angle of 225°) is improved. Furthermore, in a dark display state in which the applied voltage falls within the range of 3.0 to 4.0 V, visual angle dependence of a difference in color in the upward direction corresponding to an azimuth angle of 135° is maintained at the same level as that in the prior art.

As described above, according to the liquid crystal display device of the third embodiment, the phenomenon of brightness inversion in halftone display can be suppressed, and changes in color with changes in visual angle in the leftward and rightward directions in halftone display can be suppressed as compared with the prior art. As a result, the visual angle characteristics of the liquid crystal display device of the third embodiment are improved, and accurate display can be performed.

In the above-described embodiment, the first and second biaxial retardation plates 116 and 117 are arranged between the liquid crystal cell 101 and the analyzer 103. However, the present invention is not limited to this. For example, the first and second biaxial retardation plates 116 and 117 may be arranged between the liquid crystal cell 101 and the polarizer 102 in the order named.

Furthermore, in the above-described embodiment, the polarizer 102 is arranged such that the light-transmitting axis 102a is almost perpendicular to the incident-side aligning treatment direction 107a of the liquid crystal cell 101. However, the present invention is not limited to this. The light-transmitting axis 102a of the polarizer 102 may be set to be parallel to the incident-side aligning treatment direction 107a of the liquid crystal cell 101. Even in this case, the same effects as those of the above-described embodiment can be obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A liquid crystal display device of a twisted nematic type, comprising:
   a pair of substrates having opposing surfaces on which electrodes and aligning films covering said electrodes are respectively formed, said aligning films having undergone aligning treatment in predetermined directions;
   a liquid crystal material existing between said pair of substrates and having molecules twisted at an angle of about 90° from one substrate to the other substrate of said pair of substrates;
   a polarizer having a polarizing axis and arranged on an incident side of a liquid crystal cell, the liquid crystal cell being composed of said pair of substrates and said liquid crystal material;
   an analyzer having a polarizing axis and arranged on an exit side of said liquid crystal cell; and
   two biaxial retardation plates arranged on one side of said liquid crystal cell between said polarizer and said analyzer and having a refractive index $n_X$ in an extending direction of said retardation plate, a refractive index $n_Y$ in a direction perpendicular to the extending direction, and a refractive index $n_Z$ in a direction of thickness, which satisfy $n_Y < n_Z < n_X$, the directions being perpendicular to each other, each of said retardation plates having a phase delay axis, and wherein:
   a relationship between said polarizing axis of said polarizer and a direction of the aligning treatment of an adjacent one of the aligning films is one of the following:
   (a) perpendicular to each other, and
   (b) parallel with each other;
   a relationship between said polarizing axis of said analyzer and a direction of the aligning treatment of the other of the aligning films is one of the following:
   (a) perpendicular to each other, and
   (b) parallel with each other;
   a relationship between the phase delay axis of each of said biaxial retardation plates and the polarizing axis of an adjacent one of said polarizer and analyzer is one of the following:
   (a) perpendicular to each other, and
   (b) parallel with each other;
   a product $\Delta n \cdot d$ of a refractive index anisotropy $\Delta n$ and a thickness d of each of said biaxial retardation plates falls within a range of approximately 200 to 600 nm; and
   a product of $\Delta n \cdot d$ of a refractive index anisotropy $\Delta n$ and a thickness d of said liquid crystal material falls within a range of approximately 350 to 700 nm.

2. A liquid crystal display device according to claim 1, wherein said two biaxial retardation plates are arranged between said analyzer and said liquid crystal cell.

3. A liquid crystal display comprising:
   a pair of substrates having opposing surfaces on which electrodes and aligning films covering said electrodes are respectively formed, said aligning films having undergone aligning treatment in predetermined directions;
   a liquid crystal material existing between said pair of substrates and having molecules twisted at an angle of about 90° from one substrate to the other substrate of said pair of substrates;
   a polarizer having a polarizing axis and arranged on an incident side of a liquid crystal cell, the liquid crystal cell being composed of said pair of substrates and said liquid crystal material;
   an analyzer having a polarizing axis and arranged on an exit side of said liquid crystal cell; and
   two biaxial retardation plates arranged on one side of said liquid crystal cell between said polarizer and said analyzer and having a refractive index $n_X$ in an extending direction of said retardation plates, a refractive index $n_Y$ in a direction perpendicular to the extending direction in a plane, and a refractive index $n_Z$ in a direction of thickness, which satisfy $n_Y < n_Z < n_X$, the directions being perpendicular to each other, said extending direction being a phase delay axis,
   wherein a relationship between said polarizing axis of said polarizer and a direction of the aligning treatment of an adjacent one of the aligning films is one of the following:
   (a) perpendicular to each other, and
   (b) parallel with each other, and
   a relationship between said polarizing axis of said analyzer and a direction of the aligning treatment of the other of the aligning films is one of the following:
   (a) perpendicular to each other, and
   (b) parallel with each other.

4. A liquid crystal display device according to claim 3, wherein said polarizer and said analyzer are arranged such that their polarizing axes are substantially perpendicular to each other.

5. A liquid crystal display device according to claim 3, wherein said product $\Delta n \cdot d$ of said refractive index anisotropy $\Delta n$ and said thickness d of each of said biaxial retardation plates falls within a range of approximately 200 to 600 nm.

6. a liquid crystal display device according to claim 3, wherein said product Δn·d of said refractive index anisotropy Δn and said thickness d of said liquid crystal material falls within a range of approximately 350 to 700 nm.

7. A liquid crystal display device according to claim 3, wherein electrodes are arranged for each pixel on one of said pair of substrates in a matrix manner, and a thin film transistor for driving each electrode is connected to each electrode of each pixel.

8. A liquid crystal display device according to claim 3, wherein said two biaxial retardation plates are arranged between said analyzer and said liquid crystal cell.

* * * * *